United States Patent
Omiya et al.

(10) Patent No.: US 9,885,271 B2
(45) Date of Patent: Feb. 6, 2018

(54) HONEYCOMB STRUCTURE

(71) Applicant: NGK INSULATORS, LTD., Nagoya (JP)

(72) Inventors: Yoshimasa Omiya, Nagoya (JP); Yoshiyuki Kasai, Nagoya (JP); Kazumi Mase, Nagoya (JP); Yusuke Hosoi, Koganei (JP)

(73) Assignee: NGK Insulators, Ltd., Nagoya (JP)

( * ) Notice: Subject to any disclaimer, the term of this patent is extended or adjusted under 35 U.S.C. 154(b) by 118 days.

(21) Appl. No.: 15/088,427

(22) Filed: Apr. 1, 2016

(65) Prior Publication Data

US 2016/0215667 A1 Jul. 28, 2016

Related U.S. Application Data

(63) Continuation of application No. PCT/JP2014/076172, filed on Sep. 30, 2014.

(30) Foreign Application Priority Data

Oct. 8, 2013 (JP) .................................. 2013-211091

(51) Int. Cl.
*B01D 39/14* (2006.01)
*B01D 39/20* (2006.01)
(Continued)

(52) U.S. Cl.
CPC ............ *F01N 3/2026* (2013.01); *B01D 53/94* (2013.01); *B01J 35/04* (2013.01); *F01N 3/0222* (2013.01);
(Continued)

(58) Field of Classification Search
CPC .. F01N 3/027; F01N 2240/16; B01D 46/0057
See application file for complete search history.

(56) References Cited

U.S. PATENT DOCUMENTS 4,505,107 A * 3/1985 Yamaguchi ............. F01N 3/027
55/283
5,259,190 A * 11/1993 Bagley ............... B01D 46/0032
422/174
(Continued)

FOREIGN PATENT DOCUMENTS

CN 102218709 A1 10/2011
EP 1 283 067 A1 2/2003
(Continued)

OTHER PUBLICATIONS

Extended European Search Report (Application No. 14851889.7) dated May 18, 2017.
(Continued)

*Primary Examiner* — Amber R Orlando
(74) *Attorney, Agent, or Firm* — Burr & Brown, PLLC

(57) ABSTRACT

There is disclosed a honeycomb structure including a honeycomb structure body, and a pair of electrode members disposed on a side surface of the honeycomb structure body, an electric resistivity of the honeycomb structure body is from 1 to 200 Ωcm, each of the pair of electrode members is formed into a band shape extending in a cell extending direction of the honeycomb structure body, and in a cross section orthogonal to the cell extending direction, one electrode member is disposed on a side opposite to the other electrode member via a center of the honeycomb structure body, and in the honeycomb structure body, one or more specific slits each having an open end in the side surface are formed.

14 Claims, 6 Drawing Sheets

(51) Int. Cl.
  *B01D 39/06* (2006.01)
  *B01D 50/00* (2006.01)
  *F01N 3/20* (2006.01)
  *F01N 3/28* (2006.01)
  *F01N 3/022* (2006.01)
  *B01D 53/94* (2006.01)
  *B01J 35/04* (2006.01)

(52) U.S. Cl.
  CPC ............ *F01N 3/28* (2013.01); *F01N 3/2803* (2013.01); *F01N 3/2828* (2013.01); *F01N 2240/16* (2013.01); *F01N 2260/10* (2013.01); *F01N 2330/06* (2013.01); *F01N 2330/30* (2013.01); *Y02T 10/26* (2013.01)

(56) References Cited

U.S. PATENT DOCUMENTS

| | | | | |
|---|---|---|---|---|
| 5,266,278 | A * | 11/1993 | Harada | F01N 3/2026 |
| | | | | 219/541 |
| RE35,134 | E * | 12/1995 | Mizuno | B01J 35/0033 |
| | | | | 219/552 |
| 5,651,248 | A * | 7/1997 | Kawamura | B01D 46/0063 |
| | | | | 55/283 |
| 5,800,787 | A * | 9/1998 | Kato | B01J 35/0033 |
| | | | | 219/205 |
| 5,852,285 | A * | 12/1998 | Kato | B01J 35/0033 |
| | | | | 219/528 |
| 5,861,611 | A * | 1/1999 | Kato | B01J 35/0033 |
| | | | | 219/205 |
| 6,939,522 | B1 | 9/2005 | Harada et al. | |
| 8,158,908 | B2 * | 4/2012 | Konieczny | B01D 46/525 |
| | | | | 219/202 |
| 8,530,803 | B2 * | 9/2013 | Sakashita | B01J 35/04 |
| | | | | 219/541 |
| 8,535,405 | B2 * | 9/2013 | Noguchi | C04B 34/565 |
| | | | | 422/169 |
| 8,597,585 | B2 * | 12/2013 | Sakashita | B01J 35/04 |
| | | | | 422/174 |
| 8,716,635 | B2 * | 5/2014 | Noguchi | B01J 35/04 |
| | | | | 219/553 |
| 8,803,043 | B2 | 8/2014 | Sakashita et al. | |
| 8,907,256 | B2 * | 12/2014 | Hashimoto | F01M 5/00 |
| | | | | 219/553 |
| 2003/0140608 | A1 | 7/2003 | Hamanaka et al. | |
| 2012/0076699 | A1 * | 3/2012 | Ishihara | B01J 19/2485 |
| | | | | 422/174 |
| 2013/0043236 | A1 * | 2/2013 | Sakashita | F01N 3/2828 |
| | | | | 219/553 |
| 2014/0291315 | A1 | 10/2014 | Mase et al. | |
| 2015/0030510 | A1 | 1/2015 | Mase et al. | |

FOREIGN PATENT DOCUMENTS

| | | |
|---|---|---|
| EP | 2 784 051 A2 | 10/2014 |
| JP | 08-218856 A1 | 8/1996 |
| WO | 01/37971 A1 | 5/2001 |
| WO | 2011/125815 A1 | 10/2011 |
| WO | 2013/146955 A1 | 10/2013 |

OTHER PUBLICATIONS

International Search Report and Written Opinion (Application No. PCT/JP2014/076172) dated Jan. 6, 2015.
Chinese Office Action (Application No. 201480055553.5) dated Apr. 5, 2017 (with English translation).

* cited by examiner

HONEYCOMB STRUCTURE

TECHNICAL FIELD

The present invention relates to a honeycomb structure. More particularly, it relates to a honeycomb structure which is a catalyst carrier and also functions as a heater when a voltage is applied thereto and which is excellent in thermal shock resistance.

BACKGROUND ART

Heretofore, a honeycomb structure which is made of cordierite and onto which a catalyst is loaded has been used in a treatment of harmful substances in an exhaust gas emitted from a car engine. Additionally, it is known that a honeycomb structure formed by a silicon carbide sintered body is used in purification of the exhaust gas.

In a case where the exhaust gas is treated by the catalyst loaded onto the honeycomb structure, it is necessary to raise a temperature of the catalyst up to a predetermined temperature, but there has been the problem that at start of the engine, the catalyst temperature is low and hence the exhaust gas is not sufficiently purified.

To eliminate such a problem, there has been reported a honeycomb structure in which a pair of electrode members are disposed on a side surface of a honeycomb structure onto which a catalyst is loaded, and heat is generated in the honeycomb structure by performing energization between this pair of electrode members, so that the honeycomb structure also functions as a heater (e.g., see Patent Document 1).

CITATION LIST

Patent Document

[Patent Document 1] WO 2011/125815

SUMMARY OF THE INVENTION

Problem to be Solved by the Invention

A honeycomb structure described in Patent Document 1 is a catalyst carrier and also functions as a heater when a voltage is applied thereto, and the honeycomb structure suitably has a purification performance of an exhaust gas, but there is still room for improvement of thermal shock resistance.

The present invention has been developed in view of the abovementioned problem, and an object thereof is to provide a honeycomb structure which is a catalyst carrier and also functions as a heater when a voltage is applied thereto and which is excellent in thermal shock resistance.

Means for Solving the Problem

To solve the abovementioned problem, according to the present invention, there is provided the following honeycomb structure.

[1] A honeycomb structure including a pillar-shaped honeycomb structure body having porous partition walls defining and forming a plurality of cells which extend from one end face to the other end face and become through channels for a fluid, and a circumferential wall positioned at an outermost circumference; and a pair of electrode members disposed on a side surface of the honeycomb structure body, wherein an electric resistivity of the honeycomb structure body is from 1 to 200 $\Omega$cm, each of the pair of electrode members is formed into a band shape extending in a cell extending direction of the honeycomb structure body, and in a cross section orthogonal to the cell extending direction, one electrode member in the pair of electrode members is disposed on a side opposite to the other electrode member in the pair of electrode members via a center of the honeycomb structure body, and in the honeycomb structure body, one or more slits each having an open end in the side surface are formed, at least one of the slits is a specific slit having a first region which is a region extending in the same direction as an extending direction of the slit from the open end at a width equal to a width of the open end of the slit and second regions which are regions adjacent to the first region in a width direction in the cross section orthogonal to the cell extending direction, a length of at least a part of the second region in a direction orthogonal to the slit extending direction is a length which is not less than a length of a half of a width of the cell, a charging material is charged into the specific slit, the charging material has a first region charging portion charged into the first region in a space constituting the specific slit, and second region charging portions charged into the second regions, at least one of the second region charging portions is an effective second region charging portion, and a length of the effective second region charging portion in the direction orthogonal to the slit extending direction is a length which is not less than the length of the half of the width of the cell in the cross section orthogonal to the cell extending direction.

[2] The honeycomb structure according to the above [1], wherein the specific slit extends to be orthogonal to the partition walls of a part of the honeycomb structure body in the cross section orthogonal to the cell extending direction.

[3] The honeycomb structure according to the above [1] or [2], wherein the effective second region charging portion is constituted by at least a part of the charging material charged in an outermost circumference cell that is the cell positioned at the outermost circumference among the cells defined and formed only by the partition walls.

[4] The honeycomb structure according to any one of the above [1] to [3], wherein in the charging material, the effective second region charging portion is positioned to be adjacent to one end portion of the first region charging portion in the width direction or the effective second region charging portions are positioned to be adjacent to the one end portion and the other end portion, in the cross section orthogonal to the cell extending direction.

[5] The honeycomb structure according to the above [3] or [4], wherein the charging material is further charged into the cells defined and formed by the circumferential wall and the partition walls.

[6] The honeycomb structure according to the above [4] or [5], wherein in the charging material, the effective second region charging portions are positioned adjacent to one end portion and the other end portion of the first region charging portion in the width direction in the cross section orthogonal to the cell extending direction, and a maximum length of the effective second region charging portion is an equal length on one side and the other side of the first region charging portion in the width direction.

[7] The honeycomb structure according to any one of the above [1] to [6], wherein a depth of the specific slit has a value larger than the width of the open end of the specific slit.

[8] The honeycomb structure according to any one of the above [1] to [7], wherein a depth of the specific slit is from 1 to 80% of a radius of the honeycomb structure body.

[9] The honeycomb structure according to any one of the above [1] to [8], wherein a width of the specific slit is from 0.3 to 5% of a length of a circumference of the honeycomb structure body in the cross section orthogonal to the cell extending direction.

[10] The honeycomb structure according to any one of the above [1] to [9], wherein the number of the specific slits is from 1 to 20.

[11] The honeycomb structure according to any one of the above [1] to [10], wherein the plurality of specific slits are formed, and at least the pair of specific slits are formed which face each other via a central axis of the honeycomb structure body.

[12] The honeycomb structure according to any one of the above [1] to [11], wherein Young's modulus of the charging material is from 0.001 to 20 GPa.

[13] The honeycomb structure according to any one of the above [1] to [12], wherein a porosity of the charging material is from 40 to 80%.

[14] The honeycomb structure according to any one of the above [1] to [13], wherein an electric resistivity of the charging material is from 100 to 100000% of the electric resistivity of the honeycomb structure body.

Effect of the Invention

In a honeycomb structure of the present invention, each of a pair of electrode members is formed into a band shape extending in an extending direction of cells of a honeycomb structure body. Further, according to the honeycomb structure of the present invention, in a cross section orthogonal to the cell extending direction, one electrode member in the pair of electrode members is disposed on a side opposite to the other electrode member in the pair of electrode members via a center of the honeycomb structure body. Therefore, the honeycomb structure of the present invention is preferably usable as a heater. Additionally, in the honeycomb structure of the present invention, an electric resistivity of the honeycomb structure body is from 1 to 200 Ωcm, and hence, even when a current is passed by using a power source having a high voltage, the current does not excessively flow, and the honeycomb structure is preferably usable as the heater.

Furthermore, in the honeycomb structure of the present invention, one or more slits are formed in the honeycomb structure body, at least one slit is a specific slit, and a charging material having a first region charging portion and second region charging portions is charged into this specific slit. Further, in the honeycomb structure of the present invention, at least one of the second region charging portions of the charging material is an effective second region charging portion. Further, a length of the effective second region charging portion in a direction orthogonal to an extending direction of the slit is a length which is not less than a length of a half of a width of the cell in the cross section orthogonal to the cell extending direction. The honeycomb structure of the present invention is excellent in thermal shock resistance because the charging material has the above effective second region charging portion.

MODE FOR CARRYING OUT THE INVENTION

Next, a mode for carrying out the present invention will be described in detail with reference to the drawings. It should be understood that the present invention is not limited to the following embodiments, and design change, improvement and the like are suitably added on the basis of ordinary knowledge of a person skilled in the art without departing from the gist of the present invention.

Figure 1:
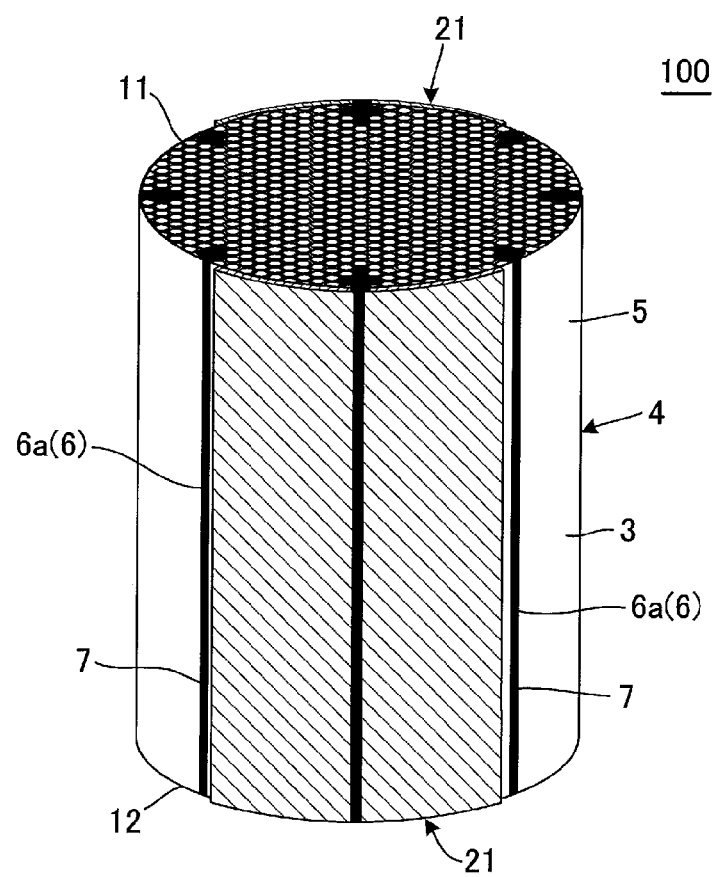
FIG. 1 is a perspective view schematically showing one embodiment of a honeycomb structure of the present invention.
Figure 2:
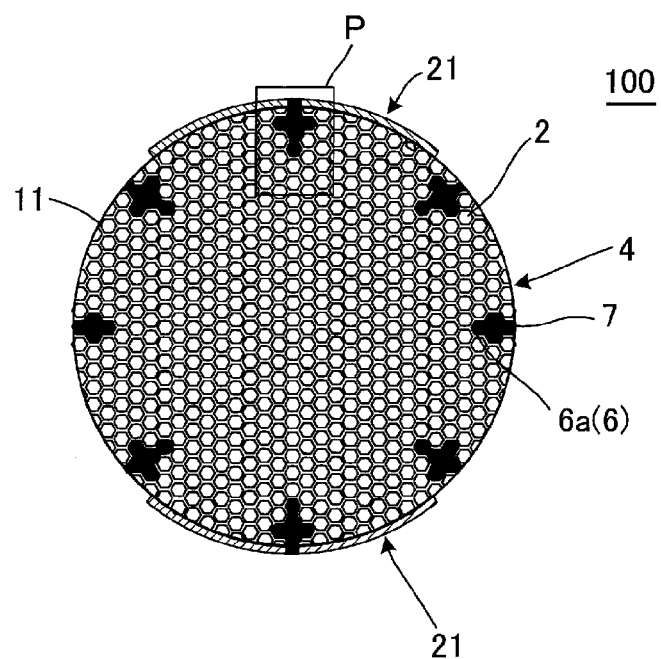
FIG. 2 is a schematic view showing one end face of the one embodiment of the honeycomb structure of the present invention.
Figure 3:
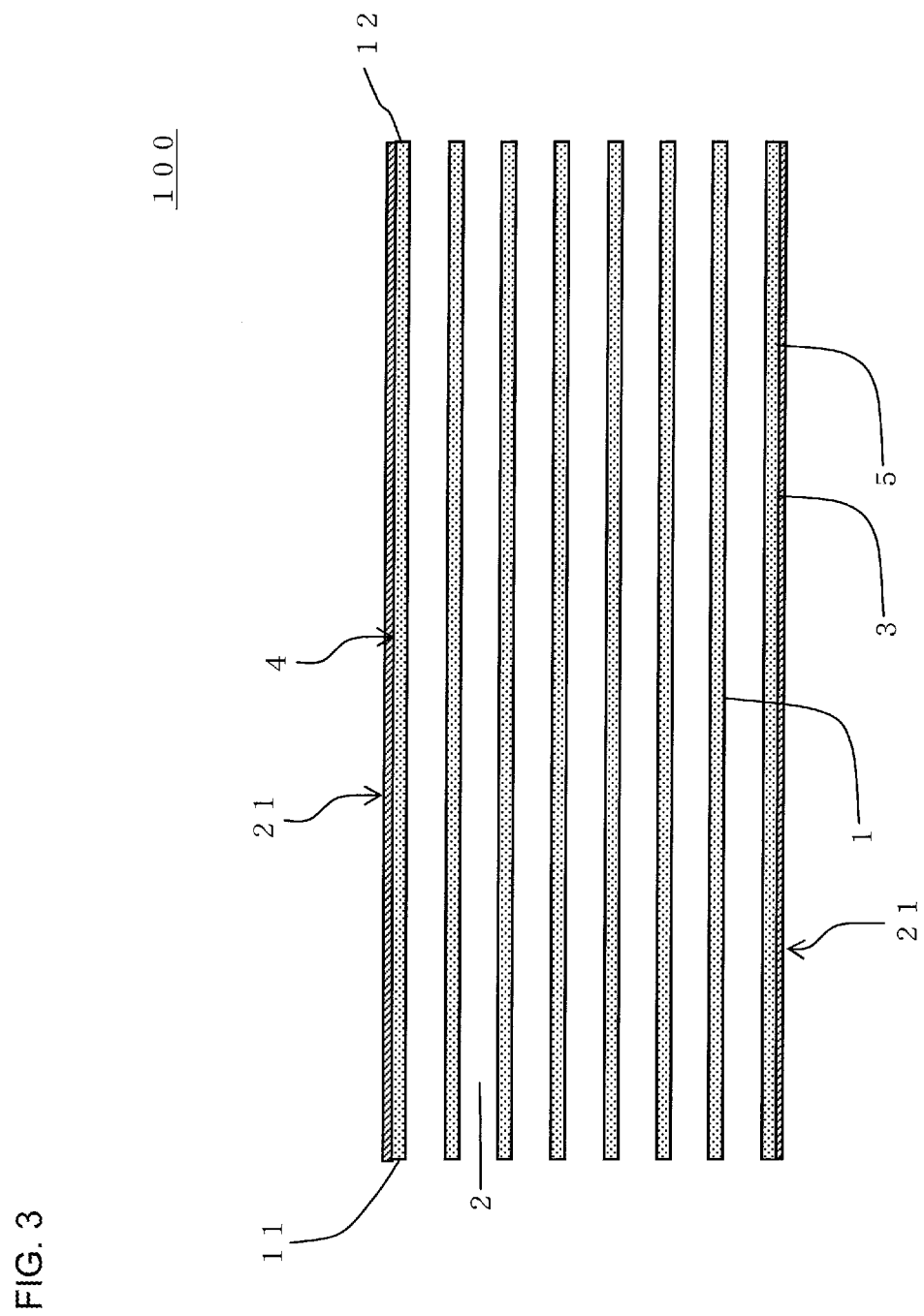
FIG. 3 is a schematic view of the one embodiment of the honeycomb structure of the present invention, showing a cross section parallel to a cell extending direction.

(1) Honeycomb Structure:

One embodiment of a honeycomb structure of the present invention includes a pillar-shaped honeycomb structure body 4 and a pair of electrode members 21 as shown in FIG. 1 to FIG. 3. The pillar-shaped honeycomb structure body 4 has porous partition walls 1 defining and forming a plurality of cells 2 which extend from one end face 11 to another end face 12 and become through channels for a fluid, and a circumferential wall 3 positioned at an outermost circumference. The pair of electrode members 21 are disposed on a side surface 5 of the honeycomb structure body 4. In a honeycomb structure 100 of the present embodiment, an electric resistivity of the honeycomb structure body 4 is from 1 to 200 Ωcm. Further, in the honeycomb structure 100 of the present embodiment, each of the pair of electrode members 21 and 21 is formed into a band shape extending in an extending direction of the cells 2 of the honeycomb structure body 4. Further, according to the honeycomb structure 100 of the present embodiment, in a cross section orthogonal to the extending direction of the cells 2, one electrode member 21 is disposed on a side opposite to the other electrode member 21 via a center O of the honeycomb structure body 4. The one electrode member 21 is one electrode member 21 in the pair of electrode members 21 and 21 (of the pair of electrode members 21 and 21), and the other electrode member 21 is the other electrode member 21 in the pair of electrode members 21 and 21 (of the pair of electrode members 21 and 21). In other words, one electrode member 21 in the pair of electrode members 21 and 21 is the one electrode member 21, and the residual one electrode member 21 in the pair of electrode members 21 and 21 is the other electrode member 21. Further, in the honeycomb structure 100 of the present embodiment, one or more slits 6 each having an open end 8 in the side surface 5 are formed in the honeycomb structure body 4. Further, in the honeycomb structure 100 of the present embodiment, at least one slit 6 is a specific slit 6a. The specific slit 6a has a first region 16 which is a region having a width equal to a width H of the open end 8 of the slit 6 and extending in the same direction as an extending direction of the slit 6 from the open end 8 in the cross section orthogonal to the extending direction of the cells 2. Additionally, the specific slit 6a also has second regions 17 (17a and 17b) (see FIG. 5) which are regions adjacent to the first region 16 in a width direction in the cross section orthogonal to the extending direction of the cells 2. A length of at least a part of the second region 17 of the specific slit 6a in a direction orthogonal to the extending direction of the slit 6 is a length which is not less than a length of a half of a width of the cell 2. Further, in the honeycomb structure 100 of the present embodiment, a charging material 7 is charged into the slit 6 (the specific slit 6a). Furthermore, in the honeycomb structure 100 of the present embodiment, the charging material 7 has a first region charging portion 18 charged into the first region 16 in a space constituting the specific slit 6a, and second region charging portions 19 charged into the second regions 17. Further, in the honeycomb structure 100, at least one of the second region charging portions 19 is an effective second region charging portion 20. Further, a length of the effective second region charging portion 20 in the direction orthogonal to the extending direction of the slit 6 satisfies a length which is not less than the length of the half of the width of the cell 2 in the cross section orthogonal to the extending direction of the cells 2. Here, in the cross section orthogonal to the extending direction of the cells 2, a maximum value of the length of one effective second region charging portion 20 in the direction orthogonal to the extending direction of the slit 6 is referred to as "a maximum length of the effective second region charging portion 20".

FIG. 1 is a perspective view schematically showing the one embodiment of the honeycomb structure of the present invention. FIG. 2 is a schematic view showing one end face of the one embodiment of the honeycomb structure of the present invention. FIG. 3 is a schematic view of the one embodiment of the honeycomb structure of the present invention, showing a cross section parallel to the cell extending direction.

It is to be noted that the side surface 5 of the honeycomb structure body 4 is the surface of the circumferential wall 3 of the honeycomb structure body 4. Further, "the slit 6 having the open end in the side surface 5 (of the honeycomb structure body 4)" is a slit which opens in the surface of the circumferential wall 3 of the honeycomb structure body 4. The slit has the open end in the side surface, and may also have open ends in end faces. That is, the slit may be formed along the whole honeycomb structure body from one end face to the other end face.

Additionally, when "the charging material is charged into the specific slit", it is meant that the charging material is charged into at least a part of one specific slit. That is, when "the charging material is charged into the specific slit", there is also included a case where the charging material is not charged into all of the space of the one specific slit. Additionally, when "the charging material is charged into at least a part", the charging material may be charged into "a part" of the specific slit in a depth direction, "a part" of the specific slit in a length direction, or a combination of these parts.

In addition, "the width of the cell" (the cell width) is a length of one side in a case where a shape of the cell in the cross section orthogonal to the cell extending direction is rectangular, and in a case of a regular hexagonal shape, the width is a distance between two vertexes facing each other via a center of the cell in the cross section orthogonal to the cell extending direction.

In the honeycomb structure 100 of the present embodiment, each of the pair of electrode members 21 and 21 is formed into the band shape extending in the extending direction of the cells 2 of the honeycomb structure body 4. Further, according to the honeycomb structure 100 of the present embodiment, in the cross section orthogonal to the extending direction of the cells 2, the one electrode member 21 in the pair of electrode members 21 and 21 is disposed opposite to the other electrode member 21 in the pair of electrode members 21 and 21 via the center O of the honeycomb structure body 4. Therefore, the honeycomb structure is preferably usable as a heater. Additionally, in the honeycomb structure 100 of the present embodiment, the electric resistivity of the honeycomb structure body 4 is from 1 to 200 Ωcm, and hence even when a current is passed by using a power source having a high voltage, the current does not excessively flow, and the honeycomb structure is preferably usable as the heater.

Furthermore, in the honeycomb structure 100 of the present embodiment, one or more slits 6 each having the open end 8 in the side surface 5 are formed in the honeycomb structure body 4. In this way, the slit 6 is formed, and hence cracks can be prevented from being generated in the side surface of the honeycomb structure body 4 when a temperature of the honeycomb structure 100 of the present embodiment rises. The charging material 7 may be charged into the slit 6 to prevent gas leakage from the slit 6 and to improve an isostatic strength of the honeycomb structure 100. Further, in the honeycomb structure 100 of the present embodiment, at least one slit 6 is the specific slit 6a, and the charging material 7 is charged into the specific slit 6a. In the charging material 7, at least a part of the second region charging portion 19 charged into the second region 17 of the specific slit 6a is the effective second region charging portion 20. That is, in the honeycomb structure 100 of the present embodiment, the charging material 7 has the effective second region charging portion 20. In the honeycomb structure 100 of the present embodiment, by forming the specific slit 6a (the slit 6), the cracks (i.e., the cracking of the partition walls) can be prevented from being generated in the side surface of the honeycomb structure body 4 when the temperature of the honeycomb structure 100 of the present embodiment rises as described above. Further, the charging material 7 is charged into the slit 6, and hence the gas leakage from the slit 6 can be prevented. Further, the charging material 7 has the effective second region charging portion 20, and hence the cracks can be prevented from being generated in the end faces of the honeycomb structure body 4. Specifically, the charging material 7 has the effective second region charging portion 20, and hence when the charging material 7 peels from the partition walls 1 in the end faces and the side surface of the honeycomb structure body 4, enlargement of the peeling into the honeycomb structure is stopped by the effective second region charging portion 20. That is, the effective second region charging portion 20 is present, and hence when the above peeling extends in the honeycomb structure to reach the effective second region charging portion 20, the peeling stops in the effective second region charging portion 20. Therefore, the honeycomb structure 100 of the present embodiment is excellent in thermal shock resistance.

Figure 4:
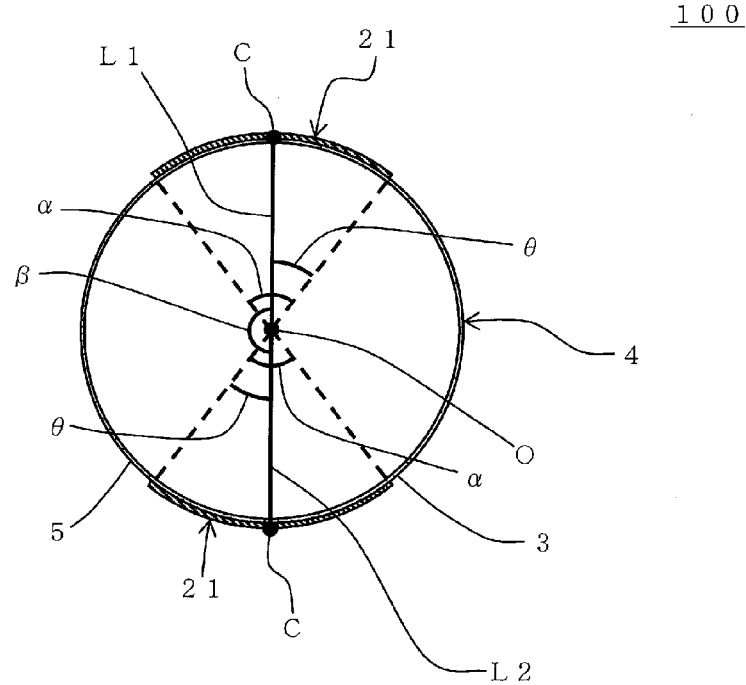
FIG. 4 is a schematic view of the one embodiment of the honeycomb structure of the present invention, showing a cross section orthogonal to the cell extending direction.

Additionally, when "in the cross section orthogonal to the extending direction of the cells 2, one electrode member 21 in the pair of electrode members 21 and 21 is disposed on the side opposite to the other electrode member 21 in the pair of electrode members 21 and 21 via the center O of the honeycomb structure body 4", the meaning is as follows. That is, as shown in FIG. 4, first in the cross section orthogonal to the extending direction of the cells 2, "a line segment connecting a central portion C of the one electrode member 21 (a point of a center in 'a circumferential direction of the honeycomb structure body 4') to the center O of the honeycomb structure body 4" is defined as a line segment L1. Further, in the cross section orthogonal to the extending direction of the cells 2, "a line segment connecting a central portion C of the other electrode member 21 (the point of the center in 'the circumferential direction of the honeycomb structure body 4') to the center O of the honeycomb structure body 4" is defined as a line segment L2. At this time, it is meant that the pair of electrode members 21 and 21 are disposed in the honeycomb structure body 4 to obtain a positional relation in which an angle β formed by the line segment L1 and the line segment L2 (an angle based on "the center O") is in a range of 170° to 190°. FIG. 4 is a schematic view of the one embodiment of the honeycomb structure of the present invention, showing the cross section orthogonal to the cell extending direction. In FIG. 4, the partition walls, the slits and the charging material are omitted. "The circumferential direction of the honeycomb structure body 4" is a direction along a circumference of the honeycomb structure body 4 in "the cross section orthogonal to the extending direction of the cells 2".

Figure 5:
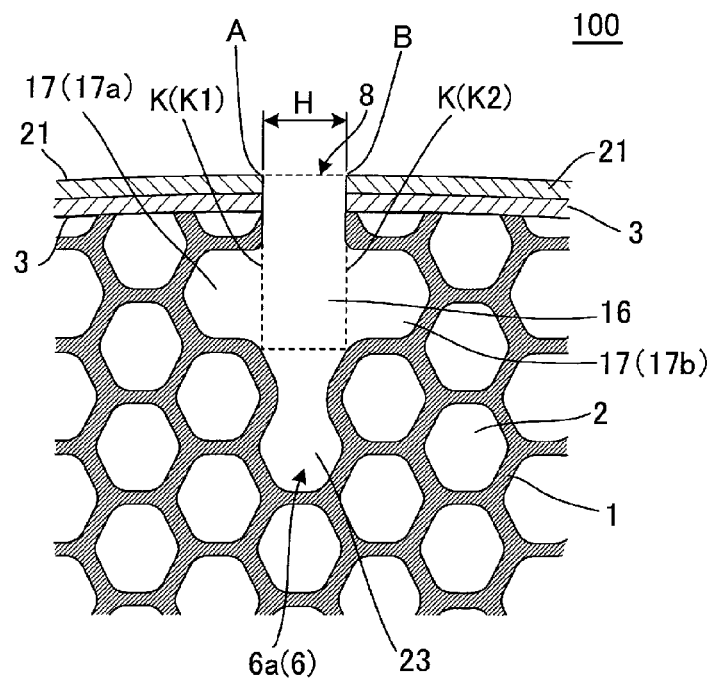
FIG. 5 is a plan view of the one embodiment of the honeycomb structure of the present invention, schematically showing an enlarged part of the one end face in a state before a charging material is charged.

(1-1) Slit;

In the honeycomb structure 100 of the present embodiment, one or more specific slits 6a are formed. As shown in FIG. 5, the specific slit 6a has the first region 16 and the second regions 17 (17a and 17b) adjacent to the first region 16 in the width direction. FIG. 5 shows the first region 16 with a broken line. As shown in FIG. 5, the specific slit 6a preferably extends to be orthogonal to parts of the partition walls 1 of the honeycomb structure body 4 in the cross section orthogonal to the extending direction of the cells 2. Additionally, the specific slit 6a may extend in parallel with parts of the partition walls 1 of the honeycomb structure body 4 in the cross section orthogonal to the extending direction of the cells 2. Furthermore, both of them may apply. FIG. 5 is a plan view of the one embodiment of the honeycomb structure of the present invention, schematically showing an enlarged end face region P (see FIG. 2) which is a part of the one end face in a state before the charging material is charged.

In the honeycomb structure 100 of the present embodiment, as shown in FIG. 5, the specific slit 6a has "a third region 23" which is a region adjacent to the first region 16 in a longitudinal direction. The third region 23 of the specific slit 6a can be formed by removing the partition walls 1 orthogonal to the extending direction of the slits, and hence the third region is easily formed. The honeycomb structure of the present invention may have the third region, or does not have to have the third region.

"The regions adjacent to the first region in the width direction" mean the following regions. That is, in the cross section orthogonal to the cell extending direction, virtual boundary lines defining and forming the first region are assumed in the space of the slit. At this time, "the regions adjacent to the first region in the width direction" mean the regions adjacent to the first region via the virtual boundary lines extending from one end and the other end of the open end of the specific slit and defined as boundaries, respectively, in the above virtual boundary lines. In the honeycomb structure 100, via a first virtual boundary line K1 extending from one end A (see FIG. 5) of the open end 8 of the specific slit 6a and a second virtual boundary line K2 extending from another end B (see FIG. 5), which are defined as the boundaries, respectively, the regions (the second regions 17a and 17b) are adjacent to the first region 16.

In the honeycomb structure 100 of the present embodiment, a depth of the specific slit 6a preferably has a value larger than the width H of the open end 8 of the specific slit 6a. In consequence, there is the advantage that, when the charging material 7 peels from the partition walls 1 in the end faces and the side surface of the honeycomb structure body 4, enlargement of this peeling into the honeycomb structure can more securely be stopped. That is, in a case where the width H of the open end 8 of the specific slit 6a is larger than the depth of the specific slit 6a (i.e., a case where the width H of the open end 8 of the specific slit 6a is large and the specific slit 6a is shallow), the charging material 7 is easy to peel from the partition walls 1. Therefore, the depth of the specific slit 6a is preferably a value larger than the width H of the open end 8 of the specific slit 6a. In this case, when the peeling of the charging material 7 is to start from a portion of the open end 8, a distance from the open end 8 to the honeycomb structure 100 is long (i.e., the specific slit 6a is deep), and hence the enlargement of the peeling of the charging material 7 into the honeycomb structure can more securely be stopped. That is, cracks can be prevented from being generated in the honeycomb structure 100.

In the honeycomb structure 100 of the present embodiment, the depth of the specific slit 6a is preferably from 1 to 80% of a radius of the honeycomb structure body 4 in a case where the honeycomb structure body is a cylinder. "The radius of the honeycomb structure body 4" is a radius of the honeycomb structure body 4 in "the cross section orthogonal to the extending direction of the cells 2". Further, the depth of the specific slit 6a is further preferably from 1 to 60% and especially preferably from 1 to 30% of the radius of the honeycomb structure body. When the depth of the specific slit 6a is smaller than 1% of the radius of the honeycomb structure body, an effect of decreasing the thermal shock resistance of the honeycomb structure 100 might deteriorate. When the depth of the specific slit 6a is larger than 80% of the radius of the honeycomb structure body, it might be difficult to uniformly pass the current through the honeycomb structure body. It is to be noted that the depth of the specific slit 6a is a distance from the circumference of the honeycomb structure body 4 except the circumferential wall 3 to the deepest position of the specific slit 6a. In a case where a plurality of specific slits are present, the depths of the specific slits may vary with each slit or all the depths may be equal.

In the honeycomb structure 100 of the present embodiment, "the width of the open end" of the specific slit 6a is preferably from 0.3 to 5% of a length of the circumference of the honeycomb structure body 4 in "the cross section orthogonal to the extending direction of the cells 2". Hereinafter, the length of the circumference of the honeycomb structure body 4 in "the cross section orthogonal to the extending direction of the cells 2" will be referred to as "the circumference length of the honeycomb structure body" sometimes. Further, the width of the open end of the specific slit 6a is further preferably from 0.3 to 3% and especially preferably from 0.3 to 1% of the circumference length of the honeycomb structure body. When the width of the open end of the specific slit 6a is smaller than 0.3% of the circumference length of the honeycomb structure body, an effect of preventing the generation of cracks (side surface cracks) generated in the side surface of the honeycomb structure might deteriorate. When the width of the open end of the specific slit 6a is larger than 1% of the circumference length of the honeycomb structure body, the isostatic strength might deteriorate. In the case where the plurality of specific slits 6a are present, the widths of the open ends of the specific slits 6a may vary with each specific slit 6a, or all the widths may be equal.

In the honeycomb structure 100 of the present embodiment, "the width" of the specific slit 6a is preferably from 0.3 to 5% of the circumference length of the honeycomb structure body. Further, the width of the specific slit 6a is further preferably from 0.3 to 3% and especially preferably from 0.3 to 1% of the circumference length of the honeycomb structure body. When the width of the specific slit 6a is smaller than 0.3% of the circumference length of the honeycomb structure body, the effect of decreasing the thermal shock resistance of the honeycomb structure 100 might deteriorate. When the width of the specific slit 6a is larger than 5% of the circumference length of the honeycomb structure body, a mechanical strength of the honeycomb structure 100 might deteriorate. "The 'width' of the specific slit 6a" is a maximum length (width) of the specific slit 6a in "a direction orthogonal to an extending direction of the open end and orthogonal to the depth direction of the slit". In the case where the plurality of specific slits are present, the widths of the specific slits 6a may vary with each specific slit, and all the widths may be equal. Here, in the honeycomb structure 100 of the present embodiment, the specific slit 6a is formed to extend in the direction in which the cells extend, and hence "the extending direction of the open end" is the same as "the cell extending direction".

The length of the specific slit 6a in "the direction orthogonal to the extending direction of the open end and orthogonal to the depth direction of the slit" is preferably maximized at a position where an outermost circumference cell is formed. In this case, there is the advantage that, when the charging material 7 peels from the partition walls 1 in the end faces and the side surface of the honeycomb structure body 4, a degree of the enlargement of this peeling into the honeycomb structure can further be decreased. The outermost circumference cell is a cell positioned at the outermost circumference in the cells defined and formed only by the partition walls.

In the honeycomb structure 100 of the present embodiment, the length of the specific slit 6a in "the cell extending direction" is preferably equal to a length of the honeycomb structure body in "the cell extending direction". That is, in the honeycomb structure 100 of the present embodiment, the specific slit 6a is preferably formed along a length between both the end faces of the honeycomb structure body (along a total length). Additionally, it is also a preferable configuration that the length of the specific slit 6a in "the cell extending direction" is from 80 to 100% of the length of the honeycomb structure body in "the cell extending direction". From the viewpoint that the honeycomb structure is excellent in thermal shock resistance, it is better that the specific slit is formed along the total length, but from the viewpoint that the strength enhances, it is preferable that there is left a part where the specific slit is not formed. In a case where the specific slit is not formed along the total length, one end of the specific slit is preferably positioned in the end face of the honeycomb structure body. In this case, the specific slit may be formed only on one end face side of the honeycomb structure body, or may be formed on both end face sides of the honeycomb structure body. In a case where the specific slits are formed on both the end face sides of the honeycomb structure body, the total length of the specific slits in "the cell extending direction" is preferably from 80 to 100% of the length of the honeycomb structure body in "the cell extending direction". Additionally, in a case where the specific slit is formed only on the one end face side of the honeycomb structure body, when the honeycomb structure is used, it is preferably to use the honeycomb structure by directing the end face side on which the specific slit is formed in a direction in which larger thermal shock is applied. In the case where the plurality of specific slits are present, the lengths of the specific slits may vary with each specific slit, or all the lengths may be equal.

Additionally, in the case where the plurality of specific slits are formed, at least a pair of specific slits are preferably formed which face each other via a central axis of the honeycomb structure body. Additionally, the depth of the specific slit, the width of the specific slit and the length of the specific slit are preferably linearly symmetric via the central axis of the honeycomb structure body which is defined as a symmetric axis.

In the honeycomb structure 100 of the present embodiment, the number of the slits 6 is preferably from 1 to 20, further preferably from 1 to 15, and especially preferably from 1 to 10. When the number of the slits 6 is in excess of 20, the mechanical strength of the honeycomb structure 100 might deteriorate. In the honeycomb structure 100 shown in FIG. 1, eight slits 6 are formed.

Additionally, in the honeycomb structure 100 of the present embodiment, the number of the specific slits 6a is preferably from 1 to 20, further preferably from 1 to 15, and especially preferably from 1 to 10. When the number of the specific slits 6a is in excess of 20, the mechanical strength of the honeycomb structure 100 might deteriorate. In the honeycomb structure 100 shown in FIG. 1, eight specific slits 6a are formed.

Figure 6:
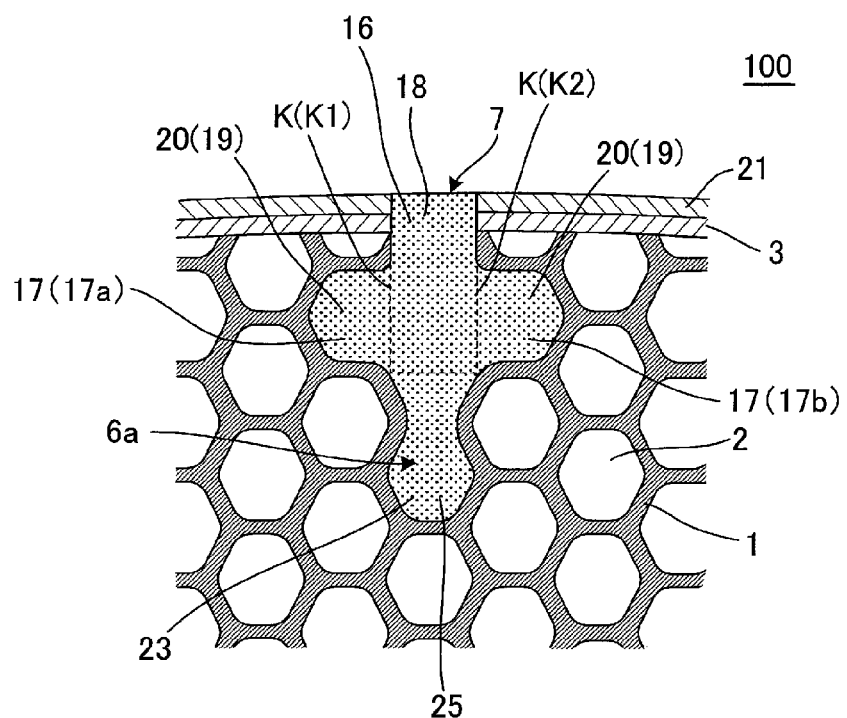
FIG. 6 is a plan view schematically showing an enlarged part of the one end face of the one embodiment of the honeycomb structure of the present invention.

(1-2) Charging Material;

The honeycomb structure 100 of the present embodiment has the charging material 7 charged into the specific slit 6a. As shown in FIG. 6, the charging material 7 has the first region charging portion 18 charged into the first region 16 (see FIG. 5) and the second region charging portions 19 charged into the second regions 17a and 17b (see FIG. 5). The second region charging portions 19 are portions adjacent to the first region charging portion 18 in the width direction, and are formed continuously with the first region charging portion 18. The first region charging portion 18 and the second region charging portions 19 are preferably integrally formed. Additionally, in the honeycomb structure 100 of the present embodiment, at least one of the second region charging portions 19 is the effective second region charging portion 20.

In the honeycomb structure 100 of the present embodiment, as shown in FIG. 6, the charging material 7 has a third region charging portion 25 charged into the third region 23 (see FIG. 5). The charging material has the third region charging portion 25, and hence there is the advantage that, when the charging material 7 peels from the partition walls 1 in the end faces and the side surface of the honeycomb structure body 4, the enlargement of this peeling into the honeycomb structure is more securely stopped. That is, if the peeling of the charging material 7 from the partition walls 1 cannot be prevented by the effective second region charging portion 20, the honeycomb structure has the third region charging portion, and hence the cracks (i.e., the cracking of the partition walls) can be prevented from being generated. Specifically, in a case where the third region charging portion is not present (i.e., the third region is a void), when the peeling enlarges to the third region, there is not anything that obstructs the subsequent enlargement of the peeling, and hence a force to enlarge the peeling is transmitted to the honeycomb structure as it is, thereby generating the cracks. On the other hand, in the case where the honeycomb structure has the third region charging portion, even when the peeling enlarges to the third region, the force to enlarge the peeling is not transmitted to the honeycomb structure as it is, thereby making it possible to prevent the cracks from being generated. It is to be noted that the honeycomb structure of the present invention may have the third region charging portion 25, but does not have to have the third region charging portion.

In the honeycomb structure 100, at least one of the second region charging portions 19 is the effective second region charging portion 20. In the effective second region charging portion 20, "a length in the direction orthogonal to the extending direction of the slit" satisfies a length which is not less than the length of the half of the width of the cell 2 in the cross section orthogonal to the extending direction of the cells 2. In the cross section orthogonal to the extending direction of the cells 2, "the length" of the effective second region charging portion 20 "in the direction orthogonal to the extending direction of the slit" is preferably 60% or more of the width of the cell 2. Further, in the cross section orthogonal to the extending direction of the cells 2, "the length" of the effective second region charging portion 20 "in the direction orthogonal to the extending direction of the slit" is further preferably 80% or more of the width of the cell 2. In the cross section orthogonal to the extending direction of the cells 2, in a case where the "the length" of the effective second region charging portion 20 "in the direction orthogonal to the extending direction of the slit" is smaller than the length of the half of the width of the cell 2, the thermal shock resistance of the honeycomb structure 100 deteriorates.

In the effective second region charging portion 20, a distance from the open end 8 of the specific slit 6a is preferably positioned in a range of 1 to 90% of the depth of the specific slit 6a in the cross section orthogonal to the extending direction of the cells 2. Further, the effective second region charging portion 20 is further preferably positioned in a range of 1 to 80% of the depth of the specific slit 6a and especially preferably positioned in a range of 1 to 70% of the depth of the specific slit 6a. In a case where the effective second region charging portion 20 is only disposed at a position in excess of 90% of the depth of the specific slit 6a, when the charging material 7 peels from the partition walls 1 in the end faces and the side surface of the honeycomb structure body 4, the enlargement of this peeling into the honeycomb structure cannot be stopped sometimes. "The distance of the effective second region charging portion 20 from the open end 8 of the specific slit 6a" is a distance from the open end 8 to "a portion closest to the circumferential wall in a boundary portion between the effective second region charging portion 20 and the first region charging portion 18".

The effective second region charging portion 20 is preferably constituted by at least a part of the charging material 7 charged into the outermost circumference cell 2 that is the cell 2 positioned at the outermost circumference in the cells 2 defined and formed only by the partition walls 1. Thus, the charging material 7 is charged, and hence there is the advantage that, when the charging material 7 peels from the partition walls 1 in the end faces and the side surface of the honeycomb structure body 4, this degree of the enlargement of this peeling into the honeycomb structure can further be decreased.

In the cross section orthogonal to the extending direction of the cells 2, the effective second region charging portion 20 may be positioned in one end portion of the first region charging portion 18 in the width direction, or the effective second region charging portions may be positioned to be adjacent to one and the other (both) end portions. The effective second region charging portions 20 are preferably positioned to be adjacent to both the end portions of the first region charging portion 18 in the width direction. Thus, when the effective second region charging portions 20 are positioned in both the end portions of the first region charging portion 18 in the width direction, there is the advantage that, when the charging material 7 peels from the partition walls 1, the enlargement of this peeling into the honeycomb structure is more securely stopped by the effective second region charging portions 20. In the honeycomb structure 100 of the present embodiment, the effective second region charging portions 20 of the charging material 7 are positioned to be adjacent to both the end portions of the first region charging portion 18 in the width direction. When the effective second region charging portion is "positioned to be adjacent to one end portion of the first region charging portion in the width direction or" the effective second region charging portions are positioned to be adjacent to "one and the other end portions", it is meant that the effective second region charging portions are positioned as follows. That is, first, in the cross section orthogonal to the extending direction of the cells 2, there are assumed the first virtual boundary line K1 (a virtual boundary line K) and the second virtual boundary line K2 (a virtual boundary line K) which are boundaries between the first region and the second region in the space of the slit. Further, it is meant that the effective second region charging portion is positioned to be adjacent to the first region charging portion 18 via one boundary of the first virtual boundary line K1 and the second virtual boundary line K2 or the one and the other (both) of the boundaries. In the honeycomb structure 100 of the present embodiment, as shown in FIG. 6, the effective second region charging portions 20 and 20 (the second region charging portions 19 and 19) are positioned to be adjacent to the first region charging portion 18 via the first virtual boundary line K1 and the second virtual boundary line K2 which are defined as the boundaries, respectively.

In a case where the effective second region charging portions 20 are positioned to be adjacent to both the end portions of the first region charging portion 18 in the width direction, the maximum length of the effective second region charging portion 20 is preferably equal on one and another (both) sides of the first region charging portion 18 in the width direction. That is, "the maximum length of the effective second region charging portion 20 positioned in the one end portion of the first region charging portion 18 in the width direction" is preferably equal to "the maximum length of the effective second region charging portion 20 positioned in the other end portion of the first region charging portion 18 in the width direction". When the maximum length of the effective second region charging portion 20 is equal on the one side and the other side of the first region charging portion 18 in the width direction in this manner and when the charging material 7 peels from the partition walls 1, the enlargement of this peeling into the honeycomb structure is securely stopped by the effective second region charging portion 20. Specifically, it is considered that in the one end portion and the other end portion of the first region charging portion 18 (the charging material 7) in the width direction in the cross section orthogonal to the extending direction of the cells 2, the peeling of the charging material 7 occurs at an equal degree of ratio. Additionally, the enlargement of the peeling of the charging material 7 can more securely be prevented by the effective second region charging portion 20 having a longer maximum length. Therefore, in a case where the maximum length of the effective second region charging portion 20 varies on the one side and the other side of the first region charging portion 18 in the width direction, i.e., in a case where one of the maximum lengths is shorter, the peeling of the charging material 7 having the shorter maximum length is easy to occur. On the other hand, in a case where the maximum length of the effective second region charging portion 20 is equal on the one and other (both) sides of the first region charging portion 18 in the width direction, the enlargement of the peeling can more securely be prevented on both the sides of the first region charging portion 18 in the width direction. The maximum length of the effective second region charging portion 20 means the maximum length of the effective second region charging portion 20 in "the direction orthogonal to the extending direction of the open end of the slit and orthogonal to the depth direction of the slit".

It is preferable that the charging material 7 is further charged into "the cells 2 (incomplete cells) defined and formed by the circumferential wall 3 and the partition walls 1 which are the cells 2 communicating with the first region". When the charging material 7 is further charged into the incomplete cells in this manner, there is the advantage that, when the charging material 7 peels from the partition walls 1 in the end faces and the side surface of the honeycomb structure body 4, the degree of the enlargement of the peeling into the honeycomb structure can further be decreased.

In the honeycomb structure 100 of the present embodiment, a depth of the charging material 7 is preferably from 80 to 100% of the depth of the specific slit 6a. Further, the depth of the charging material 7 is further preferably from 85 to 100% and especially preferably from 90 to 100% of the depth of the specific slit 6a. When the depth of the charging material 7 is smaller than 80% of the depth of the specific slit 6a, the effect of decreasing the thermal shock resistance of the honeycomb structure 100 might deteriorate. It is to be noted that "the depth of the charging material 7" is a distance from "the open end" of the specific slit 6a "in the side surface 5" to the deepest position of the charging material 7. In a case where the charging material is charged into each of the plurality of slits, the depths of the charging materials may vary with each slit, and all the depths may be equal.

In a case where a slit which does not correspond to the specific slit is formed in the honeycomb structure body, the charging material is also preferably charged into this "slit which does not correspond to the specific slit". Additionally, the charging material is preferably charged into all the slits including the specific slit. Thus, the charging material is charged into all the slits, and hence the isostatic strength of the honeycomb structure can improve.

The charging material 7 preferably contains 50 mass % or more of silicon carbide in a case where a main component of the honeycomb structure body is silicon carbide or a silicon-silicon carbide composite material. Consequently, a thermal expansion coefficient of the charging material 7 can be a value close to a thermal expansion coefficient of the honeycomb structure body, and the thermal shock resistance of the honeycomb structure can improve. Additionally, the charging material 7 may contain 50 mass % or more of silica, alumina or the like.

In the honeycomb structure 100 of the present embodiment, Young's modulus of the charging material 7 is preferably from 0.001 to 20 GPa, further preferably from 0.005 to 15 GPa, and especially preferably from 0.01 to 10 GPa. When the Young's modulus is lower than 0.001 GPa, the mechanical strength of the honeycomb structure 100 might deteriorate. When the Young's modulus is higher than 20 GPa, the thermal shock resistance of the honeycomb structure 100 might deteriorate.

In the honeycomb structure 100 of the present embodiment, a porosity of the charging material 7 is preferably from 40 to 80%, further preferably from 43 to 70%, and especially preferably from 45 to 65%. When the porosity is lower than 40%, the mechanical strength of the honeycomb structure 100 might deteriorate. When the porosity is higher than 80%, the thermal shock resistance of the honeycomb structure 100 might deteriorate.

In the honeycomb structure 100 of the present embodiment, an electric resistivity of the charging material 7 is preferably from 100 to 100000%, further preferably from 200 to 100000%, and especially preferably from 300 to 100000% of the electric resistivity of the honeycomb structure body 4. When the percentage is lower than 100%, a current is easy to flow through the charging material 7, and hence it might be difficult to uniformly pass the current through the honeycomb structure body. Also when the electric resistivity of the charging material 7 is excessively high, there is not any special problem. The charging material 7 may be an insulating material. In actual, the electric resistivity of the charging material 7 has an upper limit of about 100000% of the electric resistivity of the honeycomb structure body 4. As the charging material 7, a plurality of types of charging materials may be used together. For example, the charging material can selectively be used in accordance with a region in one specific slit, and in the case where the plurality of specific slits are present, the charging material can selectively be used in each specific slit. The electric resistivity of the charging material is a value at 400° C.

(1-3) Electrode Member;

In the honeycomb structure 100 of the present embodiment, as shown in FIG. 1 to FIG. 3, the pair of electrode members 21 and 21 are disposed on the side surface 5 of the honeycomb structure body 4. The honeycomb structure 100 of the present embodiment generates heat when a voltage is applied between the pair of electrode members 21 and 21. The voltage to be applied is preferably from 12 to 900 V and further preferably from 64 to 600 V.

In the honeycomb structure 100 of the present embodiment, as shown in FIGS. 1 and 2, the specific slits 6a are not covered with the pair of electrode members 21 and 21. The specific slit 6a preferably is not covered with the electrode member 21, but may be covered with the electrode member. In a case where the specific slit 6a is not covered with the electrode member 21, stress generated in the specific slit can be prevented from being directly transmitted to the electrode member, and hence there is the advantage that cracks can be prevented from being generated in the electrode member.

As shown in FIG. 1 to FIG. 3, each of the pair of electrode members 21 and 21 is formed into "a band shape" extending in the extending direction of the cells 2 of the honeycomb structure body 4. Further, in the cross section orthogonal to the extending direction of the cells 2, the one electrode member 21 in the pair of electrode members 21 and 21 is disposed on the side opposite to the other electrode member 21 in the pair of electrode members 21 and 21 via the center O of the honeycomb structure body 4. Therefore, when the voltage is applied between the pair of electrode members 21 and 21, the current flows through the honeycomb structure body 4, and hence the honeycomb structure body 4 can generate heat. Furthermore, as shown in FIG. 4, according to the honeycomb structure 100 of the present embodiment, in the cross section orthogonal to the extending direction of the cells 2, 0.5 time a central angle α of each of the electrode members 21 and 21 (an angle θ of 0.5 time of the central angle α) is preferably from 15 to 65°. In consequence, unevenness of the heat generation in the honeycomb structure body 4 can more effectively be inhibited. In this way, a shape of the electrode member 21 in which "0.5 time of the central angle α of the electrode member 21 is from 15 to 65° and the electrode member extends in the cell extending direction" is one configuration of "the band shape". Additionally, as shown in FIG. 4, "the central angle α of the electrode member 21" is an angle formed by two line segments connecting both ends of the electrode member 21 to the center O of the honeycomb structure body 4 in the cross section orthogonal to the extending direction of the cells 2. In other words, "the central angle α of the electrode member 21" is an inner angle of a portion of the center O in the shape (a fan shape or the like) formed by "the electrode member 21", "the line segment connecting one end portion of the electrode member 21 to the center O" and "the line segment connecting the other end portion of the electrode member 21 to the center O" in the orthogonal cross section. Here, "the orthogonal cross section" is "the cross section orthogonal to the cell extending direction of the honeycomb structure".

In the cross section orthogonal to the extending direction of the cells 2, an upper limit value of "the angle θ of 0.5 time of the central angle α" of the electrode member 21 or 21 is further preferably 60° and especially preferably 55°. Additionally, in the cross section orthogonal to the extending direction of the cells 2, a lower limit value of "the angle θ of 0.5 time of the central angle α" of the electrode member 21 or 21 is further preferably 20° and especially preferably 30°. Additionally, "the angle θ of 0.5 time of the central angle α" of the one electrode member 21 has a size of preferably 0.8 to 1.2 times and further preferably 1.0 time (an equal size) to "the angle θ of 0.5 time of the central angle α" of the other electrode member 21. In consequence, when the voltage is applied between the pair of electrode members 21 and 21, an unevenness of the current flowing through the honeycomb structure body 4 can be inhibited, and hence the unevenness of the heat generation in the honeycomb structure body 4 can be inhibited.

A thickness of the electrode member 21 is preferably from 0.01 to 5 mm. In such a range, heat can uniformly be generated.

The electrode member 21 preferably contains silicon carbide particles and silicon as main components, and except usually contained impurities, the electrode member is further preferably formed by using the silicon carbide particles and silicon as raw materials. Here, when "the silicon carbide particles and silicon are contained as the main components", it is meant that a total mass of the silicon carbide particles and silicon is 90 mass % or more of a mass of the whole electrode member. Thus, the electrode member 21 contains the silicon carbide particles and silicon as the main components, and hence the component of the electrode member 21 and the component of the honeycomb structure body 4 are the same component or close components (in a case where a material of the honeycomb structure body is silicon carbide). Therefore, thermal expansion coefficients of the electrode member 21 and the honeycomb structure body 4 are the same value or close values. Additionally, the material is the same or close, and hence a bonding strength between the electrode member 21 and the honeycomb structure body 4 heightens. Therefore, even when thermal stress is applied to the honeycomb structure, the electrode member 21 can be prevented from peeling from the honeycomb structure body 4, or a bonding portion between the electrode member 21 and the honeycomb structure body 4 can be prevented from being damaged.

An electric resistivity of the electrode member 21 is preferably from 0.1 to 100 Ωcm and further preferably from 0.1 to 50 Ωcm. The electric resistivity of the electrode member 21 is in such a range, and hence the pair of electrode members 21 and 21 effectively perform functions of electrodes in a pipe through which a high-temperature exhaust gas flows. When the electric resistivity of the electrode member 21 is smaller than 0.1 Ωcm, in the cross section orthogonal to the cell extending direction, a temperature of the honeycomb structure body in the vicinity of each end of the electrode member 21 might be easy to rise. When the electric resistivity of the electrode member 21 is larger than 100 Ωcm, the current is hard to flow, and hence the functions of the electrodes might be hard to be performed. The electric resistivity of the electrode member is a value at 400° C.

A porosity of the electrode member 21 is preferably from 30 to 60%. Consequently, the electric resistivity can suitably be obtained. The porosity is a value measured by a mercury porosimeter.

An average pore diameter of the electrode member 21 is preferably from 5 to 45 μm. Consequently, the electric resistivity can suitably be obtained. The average pore diameter is a value measured by the mercury porosimeter.

In the case where the main components of the electrode member 21 are the silicon carbide particles and silicon, an average particle diameter of the silicon carbide particles to be contained in the electrode member 21 is preferably from 10 to 60 μm. In consequence, the electric resistivity of the electrode member 21 can be controlled in a range of 0.1 to 100 Ωcm. The average particle diameter of the silicon carbide particles to be contained in the electrode member 21 is a value measured by laser diffractometry.

A ratio of a mass of silicon contained in the electrode member 21 to "a total of respective masses of the silicon carbide particles and silicon" contained in the electrode member 21 is preferably from 20 to 40 mass %. Consequently, the electric resistivity of the electrode member 21 can be adjusted in a range of 0.1 to 100 Ωcm.

In the honeycomb structure 100 of the present embodiment, a material of the partition walls 1 and the circumferential wall 3 preferably contains the silicon-silicon carbide composite material or silicon carbide as a main component (90 mass % or more). By using such a material, the electric resistivity of the honeycomb structure body can be from 1 to 200 Ωcm. The electric resistivity of the honeycomb structure body is a value at 400° C.

In the honeycomb structure 100 of the present embodiment, a partition wall thickness is from 50 to 200 μm and preferably from 70 to 130 μm. Consequently, also when the honeycomb structure 100 is used as a catalyst carrier and a catalyst is loaded thereonto, a pressure loss when passing the exhaust gas can be inhibited from being excessively large.

In the honeycomb structure 100 of the present embodiment, a cell density is preferably from 40 to 150 cells/cm$^2$. Consequently, in a state where the pressure loss when passing the exhaust gas is decreased, a purification performance of the catalyst can improve.

In the honeycomb structure 100 of the present embodiment, an average particle diameter of the silicon carbide particles (aggregates) constituting the honeycomb structure body 4 is preferably from 3 to 50 µm. Consequently, the electric resistivity of the honeycomb structure body 4 at 400° C. can be from 1 to 200 Ωcm. The average particle diameter of the silicon carbide particles is a value measured by the laser diffractometry.

In the honeycomb structure 100 of the present embodiment, the electric resistivity of the honeycomb structure body 4 is from 1 to 200 Ωcm and preferably from 10 to 100 Ωcm. When the electric resistivity is smaller than 1 Ωcm and, for example, when the honeycomb structure 100 is energized by a power source of a high voltage of 200 V or more (the voltage is not limited to 200 V), the current might excessively flow. When the electric resistivity is larger than 200 Ωcm and, for example, when the honeycomb structure 100 is energized by the power source of the high voltage of 200 V or more (the voltage is not limited to 200 V), the current might be hard to flow and heat might not sufficiently be generated. The electric resistivity of the honeycomb structure body is a value measured by a four-terminal method.

In the honeycomb structure 100 of the present embodiment, the electric resistivity of the electrode member 21 is preferably lower than the electric resistivity of the honeycomb structure body 4. The electric resistivity of the electrode member 21 is further preferably 20% or less and especially preferably from 1 to 10% of the electric resistivity of the honeycomb structure body 4. The electric resistivity of the electrode member 21 is adjusted to be 20% or less of the electric resistivity of the honeycomb structure body 4, whereby the electrode member 21 more effectively functions as the electrode.

In the honeycomb structure 100 of the present embodiment, in the case where the material of the honeycomb structure body 4 is the silicon-silicon carbide composite material, a relation between "the mass of the silicon carbide particles as the aggregates" and "a mass of silicon as a bonding material" contained in the honeycomb structure body 4 is as follows. That is, a ratio of "the mass of silicon as the bonding material" to a total of "the mass of the silicon carbide particles as the aggregates" and "the mass of silicon as the bonding material" is preferably from 10 to 40 mass %.

A porosity of the partition walls 1 of the honeycomb structure body 4 is preferably from 35 to 60%. The porosity is a value measured by the mercury porosimeter.

An average pore diameter of the partition walls 1 of the honeycomb structure body 4 is preferably from 2 to 15 µm. The average pore diameter is a value measured by the mercury porosimeter.

Additionally, a thickness of the circumferential wall 3 constituting the outermost circumference of the honeycomb structure 100 of the present embodiment is preferably from 0.1 to 2 mm.

In the honeycomb structure 100 of the present embodiment, the shape of the cells 2 in the cross section orthogonal to the extending direction of the cells 2 is preferably a quadrangular shape, a hexagonal shape, an octagonal shape or any combination of these shapes. Among these shapes, a square and the hexagonal shape are further preferable, and the hexagonal shape is especially preferable. Hereinafter, "the shape of the cells" in the cross section orthogonal to the cell extending direction will simply be referred to as "the cell shape" sometimes. When the cell shape is regularly hexagonal, stress from the circumference is advantageously dispersed.

There is not any special restriction on a shape of the honeycomb structure of the present embodiment (a shape of the honeycomb structure body), and a shape of a conventional honeycomb structure can be used.

The isostatic strength of the honeycomb structure 100 of the present embodiment is preferably 1 MPa or more. The isostatic strength is a value measured by applying hydrostatic pressure in water.

Onto the honeycomb structure 100 of the present embodiment, the catalyst is loaded, and the honeycomb structure is preferably used as a catalyst body.

Figure 7:
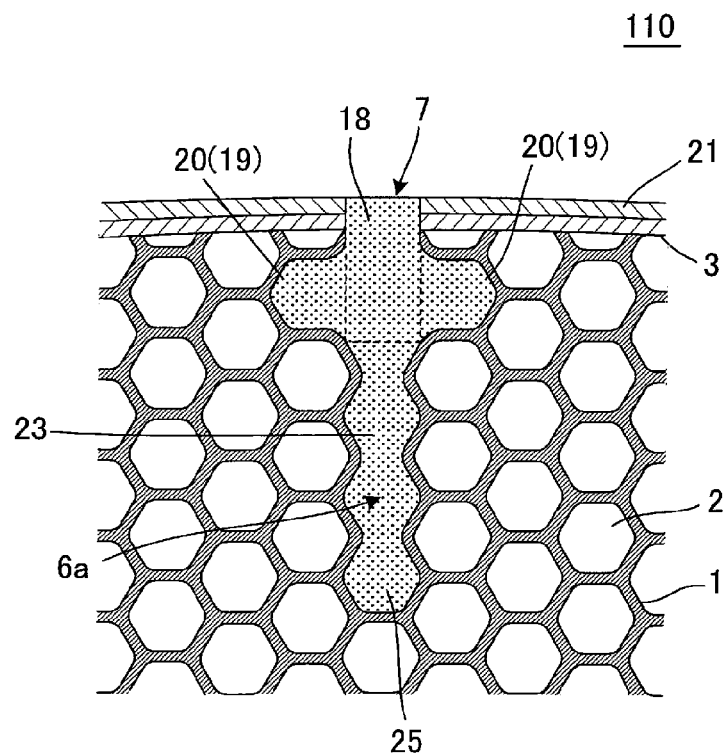
FIG. 7 is a plan view schematically showing an enlarged part of one end face of another embodiment of the honeycomb structure of the present invention.

Next, another embodiment of the honeycomb structure of the present invention will be described. As shown in FIG. 7, according to a honeycomb structure 110 of the present embodiment, in the above one embodiment of the honeycomb structure of the present invention (the honeycomb structure 100 (FIG. 6)), a specific slit 6a has a third region 23. That is, a charging material 7 is further deeply charged. When the charging material is deeply charged in this manner and when the charging material 7 peels from partition walls 1 in end faces and a side surface of a honeycomb structure body 4, enlargement of this peeling into the honeycomb structure can more securely be stopped. That is, when the charging material has a third region charging portion, cracks (i.e., cracking of the partition walls) can be prevented from being generated as described above. Further, when the charging material 7 is further deeply charged, the third region charging portion is further deeply formed. When the third region charging portion is further deeply formed, the abovementioned "force to enlarge the peeling" is hard to be transmitted to the honeycomb structure as much as a further deeply formed portion, and the cracks can further be prevented from being generated. FIG. 7 is a plan view schematically showing an enlarged part of one end face of the other embodiment of the honeycomb structure of the present invention.

Figure 8:
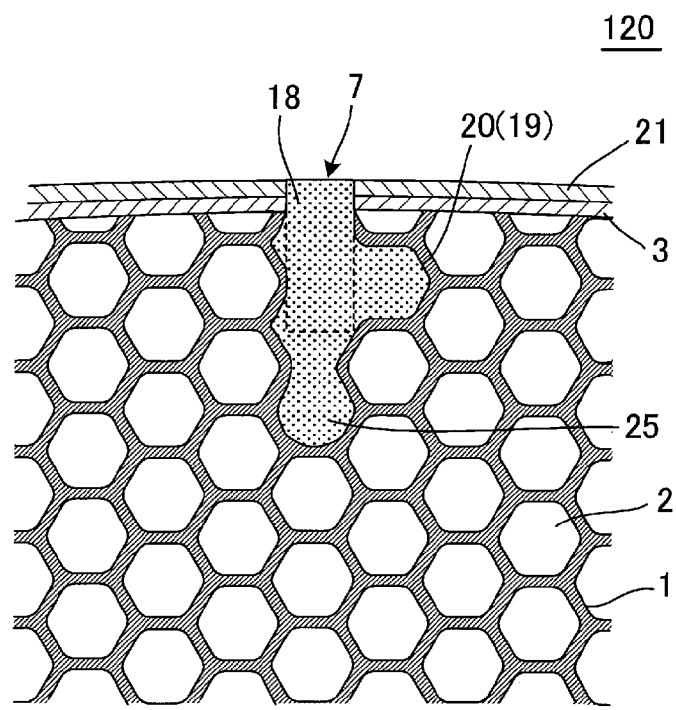
FIG. 8 is a plan view schematically showing an enlarged part of one end face of still another embodiment of the honeycomb structure of the present invention.

Next, still another embodiment of the honeycomb structure of the present invention will be described. As shown in FIG. 8, according to a honeycomb structure 120 of the present embodiment, in the above one embodiment of the honeycomb structure of the present invention (the honeycomb structure 100 (FIG. 6)), an effective second region charging portion 20 is only positioned in one end portion of a first region charging portion 18 in a width direction. When the effective second region charging portion 20 is positioned in this manner, there is the advantage that a thermal shock resistance can improve with a charging material of an amount smaller than that in the honeycomb structure 100. FIG. 8 is a plan view schematically showing an enlarged part of one end face of the still other embodiment of the honeycomb structure of the present invention.

Figure 9:
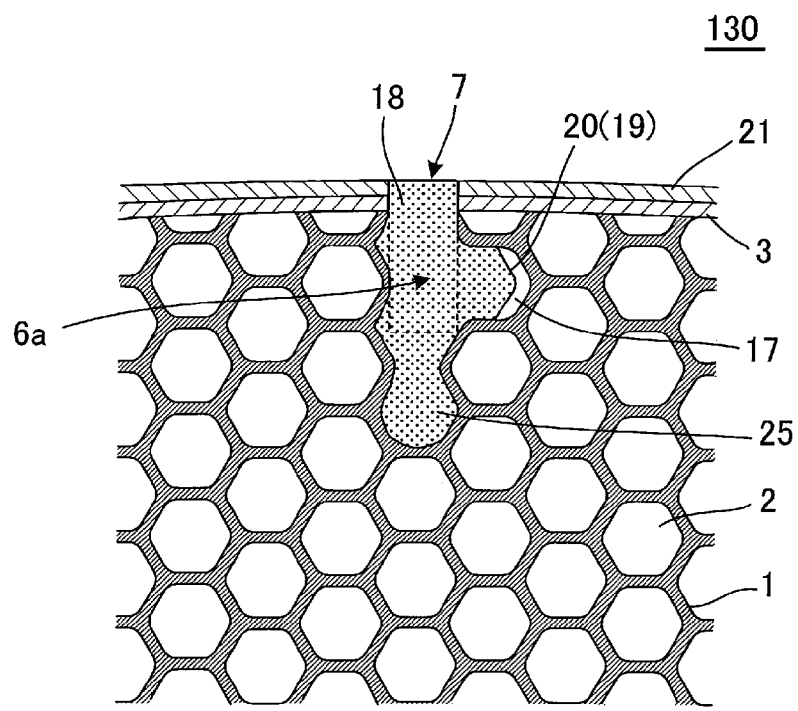
FIG. 9 is a plan view schematically showing an enlarged part of one end face of a further embodiment of the honeycomb structure of the present invention.

Next, a further embodiment of the honeycomb structure of the present invention will be described. As shown in FIG. 9, according to a honeycomb structure 130 of the present embodiment, in the above other embodiment of the honeycomb structure of the present invention (the honeycomb structure 120 (FIG. 8)), a charging material 7 is charged into a part of a second region 17 of a specific slit 6a. That is, in the honeycomb structure 130 of the present embodiment, the charging material 7 is not charged into all of the second region 17 of the specific slit 6a, but a clearance is formed in a part of the second region 17. In this way, the charging material 7 does not have to be charged into all of the second region 17 as long as the charging material has an effective second region charging portion 20, and the charging material may be charged so that the clearance is formed in a part of the second region 17. When the charging material 7 is charged in this manner, there is the advantage that a thermal shock resistance can improve with a charging material of an amount smaller than that in the honeycomb structure 120. It is to be noted that as to a first region, the charging material is preferably charged into the whole first region, but a clearance may be formed in a part of the first region. FIG. 9 is a plan view schematically showing an enlarged part of one end face of the further embodiment of the honeycomb structure of the present invention.

Figure 10:
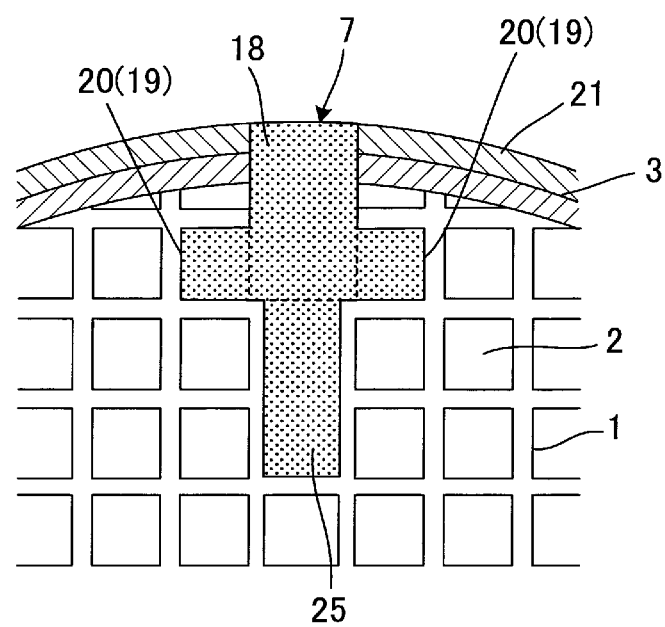
FIG. 10 is a plan view schematically showing an enlarged part of one end face of a still further embodiment of the honeycomb structure of the present invention.

Next, a still further embodiment of the honeycomb structure of the present invention will be described. As shown in FIG. 10, according to a honeycomb structure 140 of the present embodiment, in the above one embodiment (the honeycomb structure 100 (FIG. 1)) of the honeycomb structure of the present invention, a shape of cells 2 in a cross section orthogonal to an extending direction of the cells 2 is quadrangular. FIG. 10 is a plan view schematically showing an enlarged part of one end face of the still further embodiment of the honeycomb structure of the present invention.

(2) Manufacturing Method of Honeycomb Structure:

Next, one embodiment of a manufacturing method of the honeycomb structure of the present invention will be described.

(2-1) Preparation of Honeycomb Formed Body;

First, by the following method, a honeycomb formed body is prepared. To silicon carbide powder (silicon carbide), there are added metal silicon powder (metal silicon), a binder, a surfactant, a pore former, water and the like to prepare a forming raw material.

Next, the forming raw material is kneaded to form a kneaded material. There is not any special restriction on a method of kneading the forming raw material to form the kneaded material, and an example of the method is a method in which a kneader, a vacuum pugmill or the like is used.

Next, the kneaded material is extruded to prepare the honeycomb formed body. The honeycomb formed body is a structure having partition walls defining and forming a plurality of cells which become through channels for a fluid and a circumferential wall positioned at an outermost circumference.

Next, the obtained honeycomb formed body is preferably dried. The dried honeycomb formed body will be referred to as "a honeycomb dried body" sometimes. There is not any special restriction on a drying method.

(2-2) Preparation of Electrode Member Forming Raw Material;

Next, an electrode member forming raw material to form the electrode member is prepared. In a case where the main components of the electrode member are silicon carbide and silicon, the electrode member forming raw material is preferably formed by adding predetermined additives to the silicon carbide powder and silicon powder, and kneading the materials. The electrode member forming raw material is preferably pasted.

(2-3) Preparation of Honeycomb Dried Body with Electrode Member Raw Material;

Next, the obtained electrode member forming raw material is preferably applied to a side surface of the dried honeycomb formed body (the honeycomb dried body).

Next, the electrode member forming raw material applied to the side surface of the honeycomb dried body is preferably dried to prepare "the honeycomb dried body with the electrode member raw material". Drying conditions are preferably adjusted at 50 to 100° C. In steps of applying the electrode member forming raw material to the side surface of the honeycomb dried body and drying the material, a method described in International Publication No. 2011/125815 is usable.

(2-4) Preparation of Honeycomb Dried Body in which Slit is Formed;

Next, the slit is preferably formed in the honeycomb dried body with the electrode member raw material to obtain "the honeycomb dried body in which the slit is formed". The slit is preferably formed by using Leutor (an electric cutting tool) or the like. The slit is formed to have an open end in a side surface of the honeycomb dried body with the electrode member raw material. As the slit to be formed in the honeycomb dried body with the electrode member raw material, it is preferable to form at least one slit similar to the specific slit formed in the above honeycomb structure of the present invention. There is not any special restriction on a forming method of the specific slit. Hereinafter, there will be described one example of a method of forming the specific slit 6a as shown in FIG. 6. First, in a direction orthogonal to parts of partition walls of the honeycomb dried body with the electrode member raw material, cutting is performed from the side surface of the honeycomb dried body with the electrode member raw material, to form a cut slit having an open end of a width equal to a width of the open end of the specific slit. "The cut slit" is a name in a manufacturing process, which means that the slit is formed by processing (cut processing in this case), and in the obtained honeycomb structure, the cut slit becomes the specific slit having the first region and the like. Specifically, the partition walls present in a region corresponding to the first region 16 shown in FIG. 6 are cut to form a space. By this cut slit, there are formed the first region 16 and the second regions 17 in the space constituting the specific slit. Next, the partition walls are cut to further increase a depth of the cut slit. When the depth of the cut slit is further increased, there are only cut the partition walls "which are positioned in a direction in which the first region 16 deeply extends and are orthogonal to the slit extending direction". That is, the partition walls extending along the extending direction of the cut slit (the first region 16) are not cut. As shown in FIG. 1, in a case where the cell shape is hexagonal, the partition walls extending in a zigzag manner along the extending direction of the cut slit are not cut. In this way, there is formed the third region 23 in the space constituting the specific slit. In consequence, the specific slit 6a having the first region 16, the second region 17 and the third region 23 can be formed.

It is to be noted that the honeycomb dried body with the electrode member raw material is fired and then the slit may be formed. For example, in a case where a material which requires a heat treatment at a temperature lower than a firing temperature of the electrode member is used as a raw material for the charging material, "the honeycomb dried body with the electrode member raw material" is preferably prepared, followed by performing calcinating and firing, to obtain "a honeycomb fired body with the electrode member". Afterward, the slit is preferably formed in "the honeycomb fired body with the electrode member".

(2-5) Preparation of Honeycomb Dried Body with Raw Material for Charging Material;

Next, the raw material for the charging material is preferably charged into the slit of "the honeycomb dried body in which the slit is formed" and dried to obtain "the honeycomb dried body with the raw material for the charging material". The raw material for the charging material preferably has a composition similar to a preferable composition of the electrode member forming raw material. The raw material for the charging material may have a composition different from the preferable composition of the electrode member forming raw material. When the raw material for the charging material is charged into the slit, a spatula or the like is preferably used. The drying conditions are preferably adjusted at 50 to 200° C.

In the case where the raw material for the charging material has the composition different from the preferable composition of the electrode member forming raw material, the raw material preferably contains inorganic particles and an inorganic adhesive. Furthermore, the raw material for the charging material preferably contains an organic binder, a surfactant, a foamable resin, water and the like. Examples of the inorganic particles include plate-shaped particles, spherical particles, massive particles, fibrous particles, and needle-shaped particles. Additionally, examples of a material of the inorganic particles include silicon carbide, mica, talc, boron nitride, glass flakes, cordierite, alumina titanate, and lithium aluminum silicate. The inorganic particles may be a mixture of a plurality of types of inorganic particles. Further, the inorganic particles preferably contain 30 mass % or more of at least silicon carbide particles. Examples of the inorganic adhesive include colloidal silica ($SiO_2$ sol), colloidal alumina (alumina sol), various types of oxide sols, ethyl silicate, water glass, silica polymer, and aluminum phosphate.

(2-6) Firing Step;

Next, "the honeycomb dried body with the raw material for the charging material" is preferably fired to obtain the honeycomb structure. For example, a honeycomb structure such as the honeycomb structure shown in FIG. 1 is preferably prepared. On conditions of the firing, a conventional method (e.g., the method described in International Publication No. 2011/125815) is usable.

EXAMPLES

Hereinafter, the present invention will further specifically be described in accordance with examples, but the present invention is not limited to these examples.

Example 1

Silicon carbide (SiC) powder and metal silicon (Si) powder were mixed at a mass ratio of 80:20, to prepare a silicon carbide-metal silicon mixture. Further, to the silicon carbide-metal silicon mixture, hydroxypropyl methylcellulose was added as a binder, a water absorbable resin was added as a pore former, and water was also added to obtain a forming raw material, and the forming raw material was kneaded by a vacuum pugmill to prepare a round pillar-shaped kneaded material. A content of the binder was 7 parts by mass when a total of the silicon carbide (SiC) powder and the metal silicon (Si) powder was 100 parts by mass. A content of the pore former was 3 parts by mass when the total of the silicon carbide (SiC) powder and the metal silicon (Si) powder was 100 parts by mass. A content of the water was 42 parts by mass when the total of the silicon carbide (SiC) powder and the metal silicon (Si) powder was 100 parts by mass. An average particle diameter of the silicon carbide powder was 20 μm and an average particle diameter of the metal silicon powder was 6 μm. Additionally, an average particle diameter of the pore former was 20 μm. The average particle diameters of silicon carbide, metal silicon and the pore former are values measured by laser diffractometry.

The obtained round pillar-shaped kneaded material was formed by using an extruder, to obtain a honeycomb formed body. The obtained honeycomb formed body was dried by high-frequency induction heating, and then dried at 120° C. for 2 hours by use of a hot air drier, and each end face of the honeycomb formed body was cut as much as a predetermined amount.

Next, the silicon carbide (SiC) powder and the metal silicon (Si) powder were mixed at a mass ratio of 60:40, and to this mixture, hydroxypropyl methylcellulose was added as a binder, glycerin was added as a moisture retaining agent, a surfactant was added as a dispersing agent, and water was also added, followed by mixing. This mixture was kneaded to obtain an electrode member forming raw material. A content of the binder was 0.5 part by mass when a total of the silicon carbide (SiC) powder and the metal silicon (Si) powder was 100 parts by mass. A content of glycerin was 10 parts by mass when the total of the silicon carbide (SiC) powder and the metal silicon (Si) powder was 100 parts by mass. A content of the surfactant was 0.3 part by mass when the total of the silicon carbide (SiC) powder and the metal silicon (Si) powder was 100 parts by mass. A content of the water was 0.3 part by mass when the total of the silicon carbide (SiC) powder and the metal silicon (Si) powder was 100 parts by mass. An average particle diameter of the silicon carbide powder was 52 μm and an average particle diameter of the metal silicon powder was 6 μm. The average particle diameters of silicon carbide and metal silicon are values measured by laser diffractometry. The kneading was performed with a vertical type of stirrer.

Next, the electrode member forming raw material was applied to a side surface of the dried honeycomb formed body in a band shape along a space between both end portions (between both end faces) of the honeycomb formed body so that a thickness was 0.15 mm and "an angle of 0.5 time of a central angle in a cross section orthogonal to a cell extending direction was 50°". Here, "the angle of 0.5 time of the central angle in the cross section orthogonal to the cell extending direction" was "50°" and hence a length of the electrode member forming raw material in a circumferential direction of a circumference of the honeycomb formed body was 80 mm. The electrode member forming raw material was applied to two regions of the side surface of the dried honeycomb formed body. Further, in the cross section orthogonal to the cell extending direction, one of portions to which the electrode member forming raw material was applied in the two regions was disposed on a side opposite to the other portions via a center of the honeycomb formed body.

Next, the electrode member forming raw material applied to the honeycomb formed body was dried to obtain a honeycomb dried body with an electrode member raw material. Drying conditions were adjusted at 70° C.

Next, eight slits were formed in the honeycomb dried body with the electrode member raw material so that a space between the slits adjacent to each other in the circumferential direction was equal, to obtain "the honeycomb dried body in which the slits were formed". The slits were formed by using Leutor. Two of the eight slits were defined as specific slits. The two specific slits were formed to face each other via a central axis of a honeycomb structure body. Specifically, one specific slit 6a was formed at a position of "a central portion C (see FIG. 4) of one electrode member 21" and the other specific slit 6a was formed at a position of "a central portion C (see FIG. 4) of the other electrode member 21". The central portion C of the electrode member 21 is a point of the center "of a honeycomb structure body 4 in the circumferential direction".

Next, a raw material for a charging material was charged into all the slits of "the honeycomb dried body in which the slits were formed" by use of a spatula, and dried at 120° C. to obtain "the honeycomb dried body with the raw material for the charging material". As the raw material for the charging material, there was used a material prepared as follows. First, silicon carbide (SiC) powder and silica (silica powder, colloidal silica: $SiO_2$) were mixed at a mass ratio of 68:32 based on solid components. At this time, a mass of silica is a mass converted in terms of an oxide ($SiO_2$). To this mixture, carbonyl methylcellulose was added as a binder, glycerin was added as a moisture retaining agent, and water was also added, followed by mixing, to obtain a mixture. Next, this mixture was kneaded to obtain a charging material forming raw material. A content of the binder was 1.0 part by mass when a total of the silicon carbide (SiC) powder and the solid component of silica ($SiO_2$) was 100 parts by mass. A content of glycerin was 4 parts by mass when the total of the silicon carbide (SiC) powder and the solid component of silica ($SiO_2$) was 100 parts by mass. A content of the water was 30 parts by mass when the total of the silicon carbide (SiC) powder and the solid component of silica ($SiO_2$) was 100 parts by mass. An average particle diameter of the silicon carbide powder was 8 μm. This average particle diameter is a value measured by laser diffractometry. The kneading was performed by a rotation and revolution stirrer.

Next, "the honeycomb dried body with the raw material for the charging material" was degreased, fired and further subjected to an oxidation treatment to obtain a honeycomb structure. On degreasing conditions, the degreasing was performed at 550° C. for 3 hours. On firing conditions, the firing was performed under an argon atmosphere at 1450° C. for 2 hours. On oxidation treatment conditions, the oxidation treatment was performed at 1300° C. for 1 hour.

In the obtained honeycomb structure, eight slits were formed in the side surface and two of the eight slits were the specific slits. A depth of each slit was a depth (3.3 mm) of 1.9 cells (i.e., 7.1% of a radius (shown as "a ratio to the radius" in Table 2) of the honeycomb structure body). Specifically, the depth of the specific slit was the depth of 1.9 cells. A width of an open end of each slit was a width (1.7 mm) of one cell (i.e., 0.59% of a circumference length of the honeycomb structure body (shown as "a ratio to the circumference length" in Table 2). Specifically, the width of the open end of the specific slit was a width of 1 cell. A width of the specific slit was a width (4.0 mm) of 2.3 cells (i.e., 1.4% of the circumference length of the honeycomb structure body). "The width of the specific slit" was measured in the outermost circumference cell. "The width of the specific slit" is a maximum length (width) of the specific slit in "a direction orthogonal to a longitudinal direction of the open end and orthogonal to a depth direction of the slit". A cell shape in a cross section orthogonal to the cell extending direction was a regular hexagonal shape. Additionally, Table 2 shows a position where "the width of the specific slit" was measured in a column of "a position of 'the width of the specific slit'". A column of "No. of passing cells" of Table 2 shows the number of the cells passed by the specific slit at "the position where 'the width of the specific slit' was measured". Additionally, in a case where "the number of the passing cells" are counted, when there are the cells shifting in the depth direction of the specific slit, one of the cells is only counted. For example, it can be considered that the specific slit 6a shown in FIG. 6 passes three cells at "the position where 'the width of the specific slit' is measured" (a position where an effective second region charging portion 20 is formed). In this case, "the number of the passing cells" is "3". "1 (cell)" in the column of "the position of 'the width of the specific slit'" of Table 2 shows that the position where "the width of the specific slit" was measured was "the first cell counted from the outermost circumference cell", i.e., "the outermost circumference cell". "2 (cell)" shows that the position where "the width of the specific slit" was measured was "the second cell counted from the outermost circumference cell".

It is to be noted that in Table 2, when the depth of the specific slit, the width of the open end of the specific slit and the width of the specific slit are "n cells", it is indicated that each of the depth of the specific slit, the width of the open end of the specific slit and the width of the specific slit is n times a cell width.

The charging material was completely charged into the spaces of all the slits. In the two specific slits, as shown in FIG. 6, the charging material was charged into a first region and a second region of the specific slit. In the charging material, a first region charging portion and second region charging portions were continuously formed, and at least one of the second region charging portions was the effective second region charging portion. This effective second region charging portion was positioned in the outermost circumference cell. Specifically, the charging material charged into the outermost circumference cell constituting the second region of the specific slit was the effective second region charging portion. Additionally, in the charging material, the effective second region charging portions were positioned to be adjacent to "one and another" (both) end portions of the first region charging portion in a width direction, and a maximum length of the effective second region charging portion was an equal length on one side and the other side of the first region charging portion in the width direction. Additionally, in a case where the effective second region charging portions are positioned to be adjacent to "one and another" (both) end portions of the first region charging portion in the width direction, "both" are shown.

An average pore diameter (pore diameters) of partition walls of the obtained honeycomb structure was 8.6 μm and a porosity was 45%. The average pore diameter and the porosity are values measured by a mercury porosimeter. Additionally, a thickness of the partition walls of the honeycomb structure was 90 μm and a cell density was 93 cells/cm². Additionally, a bottom surface of the honeycomb structure had a round shape having a diameter (an outer diameter) of 93 mm and a length of the honeycomb structure in the cell extending direction was 75 mm. Additionally, in each of two electrode members of the honeycomb structure, 0.5 time a central angle in a cross section orthogonal to the cell extending direction was 50°. A length of the electrode member in a circumferential direction of a circumference of the honeycomb structure (Table 1 shows "a width of the electrode member") was 80 mm. Additionally, a thickness of each of the two electrode members was 0.15 mm. Additionally, an electric resistivity of the electrode member was 0.5 Ωcm and an electric resistivity of the honeycomb structure body was 35 Ωcm. Additionally, a cell shape of the honeycomb structure in the cross section orthogonal to the cell extending direction was regularly hexagonal.

Additionally, Young's modulus of the charging material of the obtained honeycomb structure was 0.5 GPa and a porosity was 52%. An electric resistivity of the charging material of the honeycomb structure was 10000 Ωcm or more.

"The Young's modulus of the charging material" is a value measured by a bending resonance method in conformity to JIS R1602. A test piece for use in the measurement was prepared by the following method. First, a bulk body was prepared by using a raw material forming the charging material. Further, a piece cut out from this bulk body into a size of 3 mm×4 mm×40 mm was defined as the test piece. Additionally, the porosity of the charging material is a value measured by the mercury porosimeter.

Next, as to the obtained honeycomb structure, "a thermal shock resistance test (a burner test)" was carried out by such a method as mentioned below. Table 3 shows the results.

Additionally, the electric resistivity of each of the honeycomb structure body, the electrode member and the charging material was measured by the following method. A test piece of 10 mm×10 mm×50 mm was prepared by the same material as in a measurement object. Specifically, in a case where the electric resistivity of the honeycomb structure body was measured, the test piece was prepared by the same material as in the honeycomb structure body, and further, in a case where the electric resistivity of the electrode member was measured, the test piece was prepared by the same material as in the electrode member. A silver paste was applied to the whole surface of each end portion of the test piece and wired to enable energization. The test piece was connected to a voltage applied current measuring device. A thermocouple was disposed in a central portion of the test piece. A voltage was applied to the test piece and a change of a test piece temperature with elapse of time when the voltage was applied was confirmed in a recorder. Further specifically, a voltage of 100 to 200 V was applied, a current value and a voltage value were measured in a state where the test piece temperature was 400° C., and the electric resistivity was calculated from the obtained current value and voltage value and a test piece dimension.

(Thermal Shock Resistance Test (Burner Test))

A heating cooling test of the honeycomb structure was carried out by using "a propane gas burner tester including a metal case in which the honeycomb structure was stored and a propane gas burner capable of supplying a heating gas into the metal case". As the above heating gas, there was used a burning gas generated by burning a propane gas with a gas burner (a propane gas burner). Further, by the above heating cooling test, it was confirmed whether or not cracks were generated in the honeycomb structure, to evaluate a thermal shock resistance. Specifically, the obtained honeycomb structure was first stored (canned) in the metal case of the propane gas burner tester. Further, the gas (the burning gas) heated by the propane gas burner was supplied into the metal case, to pass through the honeycomb structure. Temperature conditions of the heating gas flowing into the metal case (inlet gas temperature conditions) were adjusted as follows. First, the temperature was raised to a designated temperature in 5 minutes, the gas was held at the designated temperature for 10 minutes, and then the gas was cooled to 100° C. in 5 minutes and held at 100° C. for 10 minutes. Such a series of operations of temperature raising, cooling and holding will be referred to as "a temperature raising and cooling operation". Afterward, the cracks of the honeycomb structure were confirmed. Further, the above "temperature raising and cooling operation" was repeated while raising the designated temperature from 825° C. every 25° C. The designated temperature was set in 14 stages from 825° C. every 25° C. Specifically, the above "temperature raising and cooling operation" was carried out until the designated temperature reached 1150° C. When the designated temperature heightened, a temperature rise steepness increased, and when the temperature rise of a circumferential portion delayed behind a central portion, a temperature difference between the central portion and the circumferential portion enlarged, and generated stress increased. The honeycomb structure in which any cracks were not generated until the designated temperature exceeded 900° C. passed the thermal shock resistance test. That is, as long as any cracks are not generated at the designated temperature of 900° C., the honeycomb structure passes even when the cracks are generated at a further higher designated temperature, and in a case where the cracks are generated at the designated temperature of 900° C. or less, the honeycomb structure fails. In Table 3, "vertical crack" of a column of "the thermal shock resistance test" shows the designated temperature when the cracks are generated in the side surface of the honeycomb structure in the thermal shock resistance test. Additionally, in Table 3, "end face crack" of the column of "the thermal shock resistance test" shows the designated temperature when the cracks are generated in each end face of the honeycomb structure in the thermal shock resistance test.

TABLE 1

| | Outer dia. (mm) | No. of slits (slits) | Electric resistivity of honeycomb structure body (Ωcm) | Cell shape | Width of 1 cell (mm) | Length of electrode portion (mm) | Electric resistivity of electrode portion (Ω) | Presence of specific slit |
|---|---|---|---|---|---|---|---|---|
| Example 1 | 93 | 8 | 35 | Hexagonal | 1.7 | 80 | 0.5 | Present |
| Example 2 | 93 | 8 | 35 | Hexagonal | 1.7 | 80 | 0.5 | Present |
| Example 3 | 93 | 8 | 35 | Hexagonal | 1.7 | 80 | 0.5 | Present |
| Example 4 | 93 | 8 | 35 | Hexagonal | 1.7 | 80 | 0.5 | Present |
| Example 5 | 93 | 8 | 35 | Hexagonal | 1.7 | 80 | 0.5 | Present |
| Example 6 | 93 | 8 | 35 | Hexagonal | 1.7 | 80 | 0.5 | Present |
| Example 7 | 93 | 8 | 35 | Hexagonal | 1.7 | 80 | 0.5 | Present |
| Example 8 | 93 | 8 | 35 | Hexagonal | 1.7 | 80 | 0.5 | Present |
| Example 9 | 93 | 8 | 35 | Hexagonal | 1.7 | 80 | 0.5 | Present |
| Example 10 | 94 | 8 | 35 | Hexagonal | 1.7 | 80 | 0.5 | Present |
| Example 11 | 95 | 8 | 35 | Hexagonal | 1.7 | 80 | 0.5 | Present |
| Example 12 | 96 | 8 | 35 | Hexagonal | 1.7 | 80 | 0.5 | Present |
| Example 13 | 97 | 8 | 35 | Hexagonal | 1.7 | 80 | 0.5 | Present |
| Example 14 | 98 | 8 | 35 | Hexagonal | 1.7 | 80 | 0.5 | Present |
| Example 15 | 93 | 8 | 198 | Hexagonal | 1.7 | 80 | 0.5 | Present |
| Example 16 | 93 | 8 | 2 | Hexagonal | 1.7 | 80 | 0.5 | Present |

TABLE 1-continued

|  | Outer dia. (mm) | No. of slits (slits) | Electric resistivity of honeycomb structure body (Ωcm) | Cell shape | Width of 1 cell (mm) | Length of electrode portion (mm) | Electric resistivity of electrode portion (Ω) | Presence of specific slit |
|---|---|---|---|---|---|---|---|---|
| Example 17 | 93 | 8 | 35 | Quadrangular | 1.3 | 80 | 0.5 | Present |
| Comp Ex 1 | 99 | 8 | 35 | Hexagonal | 1.7 | 80 | 0.5 | Present |
| Comp Ex 2 | 99 | 8 | 35 | Hexagonal | 1.7 | 80 | 0.5 | Present |
| Comp Ex 3 | 99 | 8 | 35 | Hexagonal | 1.7 | 80 | 0.5 | Present |
| Comp Ex 4 | 93 | — | 35 | Hexagonal | 1.7 | 80 | 0.5 | None |

TABLE 2

|  | No. of specific slits (slits) | Depth of specific slit Ratio (%) to radius | Depth of specific slit (cells) | Width of open end of specific slit Ratio (%) to circumference | Width of open end of specific slit length | Width of specific slit (%) | Width of specific slit (cells) | Width of specific slit No. of passing cells (cells) | "width of specific slit" (cells) | Effective second region charging portion Presence | Effective second region charging portion Position |
|---|---|---|---|---|---|---|---|---|---|---|---|
| Example 1 | 2 | 7.1 | 1.9 | 0.59 | 1.0 | 1.4 | 2.3 | 3 | 1 | Present | Both |
| Example 2 | 2 | 7.1 | 1.9 | 0.59 | 1.0 | 1.4 | 2.3 | 3 | 1 | Present | Both |
| Example 3 | 2 | 7.1 | 1.9 | 0.59 | 1.0 | 1.4 | 2.3 | 3 | 1 | Present | Both |
| Example 4 | 2 | 9.5 | 2.5 | 0.59 | 1.0 | 1.4 | 2.3 | 3 | 1 | Present | Both |
| Example 5 | 2 | 11.8 | 3.2 | 0.59 | 1.0 | 1.4 | 2.3 | 3 | 1 | Present | Both |
| Example 6 | 2 | 14.2 | 3.8 | 0.59 | 1.0 | 1.4 | 2.3 | 3 | 1 | Present | Both |
| Example 7 | 2 | 7.1 | 1.9 | 1.19 | 2.0 | 1.8 | 3.0 | 4 | 1 | Present | Both |
| Example 8 | 2 | 7.1 | 1.9 | 1.78 | 3.0 | 2.2 | 3.7 | 5 | 1 | Present | Both |
| Example 9 | 2 | 7.1 | 1.9 | 0.59 | 1.0 | 1.0 | 1.7 | 2 | 1 | Present | Both |
| Example 10 | 2 | 7.1 | 1.9 | 0.59 | 1.0 | 1.4 | 2.3 | 3 | 2 | Present | Both |
| Example 11 | 1 | 7.1 | 1.9 | 0.59 | 1.0 | 1.4 | 2.3 | 3 | 1 | Present | Both |
| Example 12 | 4 | 7.1 | 1.9 | 0.59 | 1.0 | 1.4 | 2.3 | 3 | 1 | Present | Both |
| Example 13 | 6 | 7.1 | 1.9 | 0.59 | 1.0 | 1.4 | 2.3 | 3 | 1 | Present | Both |
| Example 14 | 8 | 7.1 | 1.9 | 0.59 | 1.0 | 1.4 | 2.3 | 3 | 1 | Present | Both |
| Example 15 | 2 | 7.1 | 1.9 | 0.59 | 1.0 | 1.4 | 2.3 | 3 | 1 | Present | Both |
| Example 16 | 2 | 7.1 | 1.9 | 0.59 | 1.0 | 1.4 | 2.3 | 3 | 1 | Present | Both |
| Example 17 | 2 | 8.2 | 3.0 | 0.43 | 1.0 | 1.3 | 3.0 | 3 | 1 | Present | Both |
| Comparative Example 1 | 2 | 7.1 | 1.9 | 0.59 | 1.0 | 0.6 | 1.0 | 1 | 1 | None | — |
| Comparative Example 2 | 2 | 7.1 | 1.9 | 1.19 | 2.0 | 1.0 | 1.7 | 2 | 1 | None | — |
| Comparative Example 3 | 2 | 7.1 | 1.9 | 1.78 | 3.0 | 1.4 | 2.3 | 3 | 1 | None | — |
| Comparative Example 4 | — | — | — | — | — | — | — | — | — | — | — |

TABLE 3

|  | Young's modulus of charging material (GPa) | Porosity of charging material (%) | Thermal shock resistance test (° C.) Vertical crack | Thermal shock resistance test (° C.) End face crack |
|---|---|---|---|---|
| Example 1 | 0.5 | 52 | 950 | 950 |
| Example 2 | 0.01 | 65 | 975 | 975 |
| Example 3 | 10 | 45 | 925 | 925 |
| Example 4 | 0.5 | 52 | 950 | 975 |
| Example 5 | 0.5 | 52 | 950 | 1000 |
| Example 6 | 0.5 | 52 | 950 | 1025 |
| Example 7 | 0.5 | 52 | 925 | 950 |
| Example 8 | 0.5 | 52 | 900 | 950 |
| Example 9 | 0.5 | 52 | 950 | 925 |
| Example 10 | 0.5 | 52 | 950 | 925 |
| Example 11 | 0.5 | 52 | 950 | 925 |
| Example 12 | 0.5 | 52 | 950 | 975 |
| Example 13 | 0.5 | 52 | 950 | 1000 |
| Example 14 | 0.5 | 52 | 950 | 1025 |
| Example 15 | 0.5 | 52 | 950 | 950 |
| Example 16 | 0.5 | 52 | 950 | 950 |
| Example 17 | 0.5 | 52 | 925 | 925 |
| Comparative Example 1 | 0.5 | 52 | 950 | 900 |
| Comparative Example 2 | 0.5 | 52 | 925 | 900 |
| Comparative Example 3 | 0.5 | 52 | 900 | 900 |
| Comparative Example 4 | — | — | 825 | None generated |

Examples 2 to 17 and Comparative Examples 1 to 4

The procedure of Example 1 was repeated except that respective conditions were changed as shown in Tables 1 and 2, to prepare honeycomb structures. "A thermal shock resistance test" was carried out in the same manner as in Example 1. Table 3 shows the results.

It is seen from Table 3 that a honeycomb structure "in which a specific slit is formed and a charging material charged into this specific slit has an effective second region charging portion" is excellent in thermal shock resistance.

INDUSTRIAL APPLICABILITY

A honeycomb structure of the present invention can suitably be utilized as a catalyst carrier for an exhaust gas purifying device which purifies an exhaust gas of a car.

DESCRIPTION OF REFERENCE NUMERALS

1: partition wall, 2: cell, 3: circumferential wall, 4: honeycomb structure body, 5: side surface, 6: slit, 6a: specific slit, 7: charging material, 8: open end, 11: one end face, 12: the other end face, 16: first region, 17, 17a and 17b: second region, 18: first region charging portion, 19: second region charging portion, 20: effective second region charging portion, 21: electrode member, 23: third region, 25: third region charging portion, 100, 110, 120, 130 and 140: honeycomb structure, O: center, C: central portion (of the electrode member), K: virtual boundary line, K1: first virtual boundary line, K2: second virtual boundary line, L1 and L2: line segment, a: central angle, β: angle, θ: angle of 0.5 time of the central angle, A: one end, B: the other end, H: width of the open end, and P: end face region.

The invention claimed is:

1. A honeycomb structure comprising:
a pillar-shaped honeycomb structure body having porous partition walls defining and forming a plurality of cells which extend from one end face to the other end face and become through channels for a fluid, and a circumferential wall positioned at an outermost circumference; and a pair of electrode members disposed on a side surface of the honeycomb structure body,
wherein an electric resistivity of the honeycomb structure body is from 1 to 200 Ωcm,
each of the pair of electrode members is formed into a band shape extending in a cell extending direction of the honeycomb structure body,
in a cross section orthogonal to the cell extending direction, one electrode member in the pair of electrode members is disposed on a side opposite to the other electrode member in the pair of electrode members via a center of the honeycomb structure body,
in the honeycomb structure body, one or more slits each having an open end in the side surface are formed,
at least one of the slits is a specific slit having a first region which is a region extending in the same direction as an extending direction of the slit from the open end at a width equal to a width of the open end of the slit and second regions which are regions adjacent to the first region in a width direction in the cross section orthogonal to the cell extending direction, a length of at least a part of the second region in a direction orthogonal to the slit extending direction is a length which is not less than a length of a half of a width of the cell,
a charging material is charged into the specific slit, and
the charging material has a first region charging portion charged into the first region in a space constituting the specific slit, and second region charging portions charged into the second regions, at least one of the second region charging portions is an effective second region charging portion, and a length of the effective second region charging portion in the direction orthogonal to the slit extending direction is a length which is not less than the length of the half of the width of the cell in the cross section orthogonal to the cell extending direction.

2. The honeycomb structure according to claim 1, wherein the specific slit extends to be orthogonal to the partition walls of a part of the honeycomb structure body in the cross section orthogonal to the cell extending direction.

3. The honeycomb structure according to claim 1, wherein the effective second region charging portion is constituted by at least a part of the charging material charged in an outermost circumference cell that is the cell positioned at the outermost circumference among the cells defined and formed only by the partition walls.

4. The honeycomb structure according to claim 1, wherein in the charging material, the effective second region charging portion is positioned to be adjacent to one end portion of the first region charging portion in the width direction or the effective second region charging portions are positioned to be adjacent to the one end portion and the other end portion, in the cross section orthogonal to the cell extending direction.

5. The honeycomb structure according to claim 3, wherein the charging material is further charged into the cells defined and formed by the circumferential wall and the partition walls.

6. The honeycomb structure according to claim 4, wherein in the charging material, the effective second region charging portions are positioned adjacent to one end portion and the other end portion of the first region charging portion in the width direction in the cross section orthogonal to the cell extending direction, and a maximum length of the effective second region charging portion is an equal length on one side and the other side of the first region charging portion in the width direction.

7. The honeycomb structure according to claim 1, wherein a depth of the specific slit has a value larger than the width of the open end of the specific slit.

8. The honeycomb structure according to claim 1, wherein a depth of the specific slit is from 1 to 80% of a radius of the honeycomb structure body.

9. The honeycomb structure according to claim 1, wherein a width of the specific slit is from 0.3 to 5% of a length of a circumference of the honeycomb structure body in the cross section orthogonal to the cell extending direction.

10. The honeycomb structure according to claim 1, wherein the number of the specific slits is from 1 to 20.

11. The honeycomb structure according to claim 1, wherein the plurality of specific slits are formed, and at least the pair of specific slits are formed which face each other via a central axis of the honeycomb structure body.

12. The honeycomb structure according to claim 1, wherein Young's modulus of the charging material is from 0.001 to 20 GPa.

13. The honeycomb structure according to claim 1, wherein a porosity of the charging material is from 40 to 80%.

14. The honeycomb structure according to claim 1, wherein an electric resistivity of the charging material is from 100 to 100000% of the electric resistivity of the honeycomb structure body.

* * * * *